United States Patent
Park et al.

(10) Patent No.: US 8,313,068 B2
(45) Date of Patent: Nov. 20, 2012

(54) LIFTING DEVICE FOR DISPLAY APPARATUS

(75) Inventors: Jae Hoo Park, Suwon-si (KR); Boo Keun Yoon, Suwon-si (KR); Sang Hak Kim, Suwon-si (KR); Gi Hyun Tae, Yongin-si (KR); Bong Joo Kim, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 431 days.

(21) Appl. No.: 12/437,649

(22) Filed: May 8, 2009

(65) Prior Publication Data

US 2009/0278006 A1  Nov. 12, 2009

(30) Foreign Application Priority Data

May 8, 2008   (KR) .................. 10-2008-0043078
Jul. 10, 2008  (KR) .................. 10-2008-0066779
Nov. 30, 2008  (KR) .................. 10-2008-0120212

(51) Int. Cl.
*A47B 96/06* (2006.01)

(52) U.S. Cl. ............ 248/205.1; 248/328; 248/917; 361/679.02

(58) Field of Classification Search ............ 248/289.11, 248/282.1, 274.1, 917, 919, 205.1, 324, 325, 248/328, 329, 922, 923, 292.13, 292.11, 248/489, 493, 494, 495; 361/679.02, 681

See application file for complete search history.

(56) References Cited

U.S. PATENT DOCUMENTS

| | | | | |
|---|---|---|---|---|
| 7,318,572 B2 * | 1/2008 | Dozier | .................... | 248/294.1 |
| 7,445,187 B2 * | 11/2008 | Shin | .................... | 248/324 |
| 7,663,868 B1 * | 2/2010 | Lam | .................... | 361/679.06 |
| 7,731,143 B2 * | 6/2010 | Muday et al. | .................... | 248/284.1 |
| 2008/0105801 A1 * | 5/2008 | Dozier | .................... | 248/205.1 |
| 2008/0258029 A1 * | 10/2008 | Zhang | .................... | 248/284.1 |

FOREIGN PATENT DOCUMENTS

| | | |
|---|---|---|
| GB | 384616 | 12/1932 |
| KR | 20020057425 | 7/2002 |
| KR | 20040085434 | 10/2004 |
| KR | 20050070839 | 7/2005 |
| KR | 20070077657 | 7/2007 |

OTHER PUBLICATIONS

Korean Office Action issued Jan. 13, 2010 in KR Application No. 2008-0120212.

* cited by examiner

*Primary Examiner* — Terrell McKinnon
*Assistant Examiner* — Monica Millner
(74) *Attorney, Agent, or Firm* — Stanzione & Kim, LLP

(57) ABSTRACT

Disclosed is a lifting device for a display apparatus that may include a tilting unit to allow a user to easily adjust a viewing angle of the display apparatus. The lifting device may include a wire connected to the display apparatus, and at least one tilting unit to adjust a viewing angle of the display apparatus. The tilting unit may include a rotatable arm to adjust a distance between a wall and the display apparatus, and a rotation obstructer to provide the arm, which may be supported on both the wall and the display apparatus, with a force counter to a force applied by the display apparatus to the wall when no external force is applied.

19 Claims, 17 Drawing Sheets

LIFTING DEVICE FOR DISPLAY APPARATUS

CROSS-REFERENCE TO RELATED APPLICATIONS

This application claims priority under 35 U.S.C. §119(a) of Korean Patent Applications No. 2008-0043078, filed on May 8, 2008, No. 2008-0066779, filed on Jul. 10, 2008, and No. 2008-0120212, filed on Nov. 30, 2008 in the Korean Intellectual Property Office, the disclosure of which is incorporated herein by reference.

BACKGROUND

1. Field of the Invention

The present invention relates to a lifting device for a display apparatus, and, more particularly, to a lifting device for a display apparatus, a tilting unit of which is able to be tilted toward or away from a wall.

2. Description of the Related Art

A display apparatus is a type of screen output apparatus, such as televisions, computer monitors, etc., and is currently used in homes, offices, and the like. In recent years, a flat panel type display apparatus having a thin thickness and small volume, such as a Liquid Crystal Display (LCD), Plasma Display Panel (PDP), etc., has been developed and widely used, and demand therefor is gradually increasing.

Such a flat panel type display apparatus having a thin thickness enables more effective space utilization when mounted to a wall, thus exhibiting convenience of use. For this reason, a variety of supporting devices to mount a display apparatus to the wall have been developed.

As one example of a supporting device for a display apparatus, Korean Patent Laid-Open Publication No. 2005-0070839 discloses a wall-mounted device for a wall-mounted TV. The disclosed wall-mounted device mounts a flat wall-mounted TV to a wall in a simplified manner and also, allows a viewer to adjust a viewing angle of the wall-mounted TV to a desired position.

The wall-mounted device for a wall-mounted TV disclosed in the above Publication (hereinafter, referred to as a "supporting device for a display apparatus") includes: a back cover defining a rear surface of the wall-mounted TV; a wall-mounted wire to allow the wall-mounted TV to be hung and fixed to a wall; a wire fixing part integrally formed with a rear surface of the back cover to fix the wire; and an angle adjustor provided at the rear surface of the back cover and used to adjust a viewing angle of the wall-mounted TV.

However, with relation to the angle adjustor included in the supporting device disclosed in the above Publication, in order to adjust the viewing angle, a viewer must directly rotate upper and lower pivoting parts of the angle adjustor mounted to the back cover thus making adjustment of the viewing angle of the display apparatus difficult.

Further, the upper and lower pivoting parts are configured such that hinges provided at upper and lower ends thereof are coupled into upper and lower recesses of a fixing plate. With this configuration, gaps occur between the hinges and the recesses due to an assembly tolerance and frequent use of the angle adjustor or the like cause risk of the upper and lower pivoting parts being rotated by the weight of the display apparatus, making it difficult for the viewer to adjust the display apparatus to a desired viewing angle.

Furthermore, providing the back cover of the wall-mounted TV with the wire fixing part used to fix the wire requires an additional process to fabricate of the wire fixing part, resulting in an increase in the number of manufacturing processes and manufacturing costs.

In addition, the configuration of coupling the wall-mounted wire to the back cover of the wall-mounted TV causes an upper portion of the wall-mounted TV to be kept at a forwardly tilted position, regardless of adjustment in viewing angle.

SUMMARY

Therefore, it is a feature of an embodiment of the present general inventive concept to provide a lifting device for a display apparatus including a tilting unit to allow a user to easily adjust a viewing angle of the display apparatus.

Additional features and/or advantages will be set forth in part in the description which follows and, in part, will be obvious from the description, or may be learned by practice of the invention.

It is another feature of the embodiment to provide a lifting device for a display apparatus having a configuration capable of preventing malfunction of a tilting unit.

It is a further feature of an embodiment of the present general inventive concept to provide a lifting device for a display apparatus capable of connecting a wire to the display apparatus without additional processing.

It is a still a further feature of an embodiment of the present general inventive concept to provide a lifting device for a display apparatus capable of fixedly mounting the display apparatus to a wall substantially in parallel.

Embodiments of the present general inventive concept can be achieved by the provision of a lifting device for a display apparatus including: a wire connected to the display apparatus; and at least one tilting unit to adjust a viewing angle of the display apparatus, wherein the tilting unit includes a rotatable arm to adjust a distance between a wall and the display apparatus, and a rotation obstructer to provide the arm, supported on both the wall and the display apparatus, with a force counter to a force applied by the display apparatus to the wall when no external force is applied.

The tilting unit may further include a drive motor to rotate the arm.

The rotation obstructer may be the drive motor to generate a predetermined stop torque.

The distance between the wall and the display apparatus may be adjusted according to a predetermined rotation angle of the arm.

The lifting device may further include a bracket to mount the tilting unit to a rear surface of the display apparatus, and the bracket may include a holder to fix the wire.

The tilting unit may further include a wheel provided at one side of the arm and adapted to be rotated relative to the arm.

The rotation obstructer may be a bearing coupled to a rotating shaft of the arm and serving to generate an opposite directional torque when the arm is rotated in a given direction.

The tilting unit may further include an elastic member coupled to a rotating shaft of the arm and serving to provide the arm with an elastic force so as to allow the arm to press the wall.

A plurality of VESA holes may be formed in the rear surface of the display apparatus according to Video Electronics Standards Association (VESA) wall mount standards, and the bracket may be fixed to the VESA holes.

Upper and lower holes may be formed in a rear surface of the display apparatus, and the lifting device may further include: a coupling screw fastened into the upper hole so as to fix an end of the wire to the display apparatus; and a spacing member fastened to the lower hole so as to space the rear surface of the display apparatus from the wall by a predetermined distance.

The upper and lower holes may be VESA holes formed according to Video Electronics Standards Association (VESA) wall mount standards.

The spacing member may include a wheel to be moved on the wall during a tilting operation of the display apparatus.

The lifting device may further include at least one auxiliary tilting unit provided under the tilting unit and used to tilt a lower portion of the display apparatus forward or rearward.

A pair of upper holes and a pair of lower holes may be formed in a rear surface of the display apparatus, and both ends of the wire may be coupled to the pair of upper holes, and the at least one auxiliary tilting unit may include a pair of auxiliary tilting units to be coupled to the pair of lower holes, respectively.

The auxiliary tilting unit may include a fixing part to be coupled to the lower hole, and a rotating arm rotatably mounted to the fixing part.

The fixing part may include a screw insertion hole for screw fastening, and a supporting portion to prevent excessive rotation of the rotating arm.

Embodiments can provide a lifting device for a display apparatus including: a wire connected to the display apparatus, to hang the display apparatus on a wall; and a tilting unit to adjust a viewing angle of the display apparatus, wherein the tilting unit includes an operating lever, and a link to be moved via operation of the operating lever so as to adjust an inclination angle of the display apparatus with relation to the wall.

The tilting unit may include a fixing frame fixed to one of the wall and a rear surface of the display apparatus, one end of the operating lever being rotatably coupled to the fixing frame.

The lifting device may further include a wire hanger to fix the wire, connected to the display apparatus, to the wall.

The link may include first and second links, a coupling angle of the first and second links being variable based on rotation of the operating lever.

The other end of the operating lever may be provided with an operating wire to operate the operating lever.

Further embodiments can provide a lifting device for a display apparatus including a wire connected to the display apparatus to hang the display apparatus on a wall, and at least one tilting unit to adjust a viewing angle of the display apparatus using a force acting on the display apparatus, wherein the tilting unit includes an arm to apply a force to the display apparatus and the wall so as to maintain the viewing angle of the display apparatus when the force acting on the display apparatus is removed.

The arm may be a hydraulic or pneumatic cylinder exhibiting a predetermined force to maintain the viewing angle when the force acting on the display apparatus is removed.

The arm may include a cylinder and a piston to reciprocally move in the cylinder, and one end of the cylinder may be rotatably fixed to the wall, and one end of the piston may be rotatably fixed to the display apparatus.

The arm may be rotatably provided to adjust a distance between the wall and the display apparatus based on a predetermined rotation angle of the arm.

The at least one tilting unit may include a pair of tilting units mounted to a rear surface of the display apparatus.

The arm may be rotatable up-and-down or left-and-right.

The tilting unit may further include a rotation obstructer coupled to a rotating shaft of the arm and may serve to generate an opposite directional torque when the arm is rotated in a given direction.

The tilting unit may further include an elastic member coupled to a rotating shaft of the arm and may serve to apply an elastic force to the arm so as to allow the arm to press the wall.

The bracket may include a stopper to prevent excessive rotation of the arm, and the arm may include a stopper holder corresponding to the stopper.

The lifting device may further include at least one auxiliary tilting unit provided under the tilting unit and used to tilt a lower portion of the display apparatus forward or rearward.

Embodiments of the present general inventive concept also provide a support device for a display apparatus comprising a housing having a front side and a rear side; a wire unit mounted on a first portion of the rear side to be connectable to an external element disposed on a reference plane; and a roller unit mounted on a second portion of the rear side to be disposed on the reference plane.

Embodiments of the present general inventive concept also provide for a method of adjusting the viewing angle of a display apparatus including affixing a tilting unit with at least one rotatable arm to a display surface; fastening a wire to the display apparatus; connecting the wire to the tilting unit; and controlling the at least one rotatable arm to adjust a distance between the display surface and the display apparatus.

Embodiments of the present general inventive concept also provide for a method for supporting a display apparatus with a display housing comprising fastening a roller unit along a rear side of the display housing; attaching a wire hanger unit to an external reference plane; affixing at least one wire unit to the rear side of the display housing at a distance away from the roller unit; and connecting the at least one wire unit to the wire hanger unit.

BRIEF DESCRIPTION OF THE DRAWINGS

These and/or other features and utilities of the present general inventive concept will become apparent and more readily appreciated from the following description of the embodiments, taken in conjunction with the accompanying drawings, of which.

DETAILED DESCRIPTION OF THE EMBODIMENTS

Figure 1:
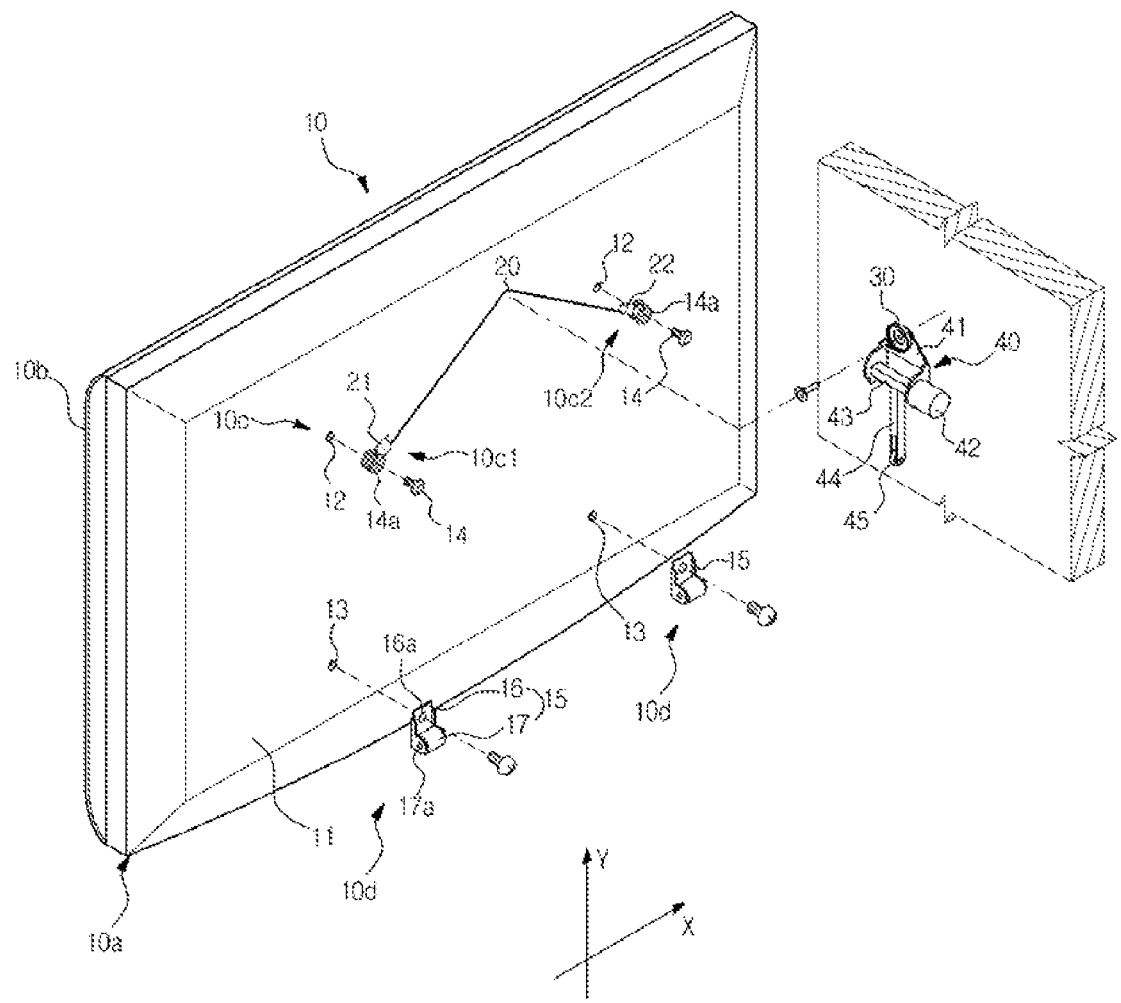
FIG. 1 is an exploded perspective view illustrating the overall outer appearance of a lifting device for a display apparatus according to an exemplary embodiment of the present general inventive concept.

Reference will now be made in detail to exemplary embodiments of the present general inventive concept, examples of which are illustrated in the accompanying drawings, wherein like reference numerals refer to like elements throughout. The embodiments are described below to explain the present general inventive concept by referring to the figures.

Now, a lifting device for a display apparatus according to an exemplary embodiment of the present general inventive concept will be described with reference to the accompanying drawings.

Figure 2:
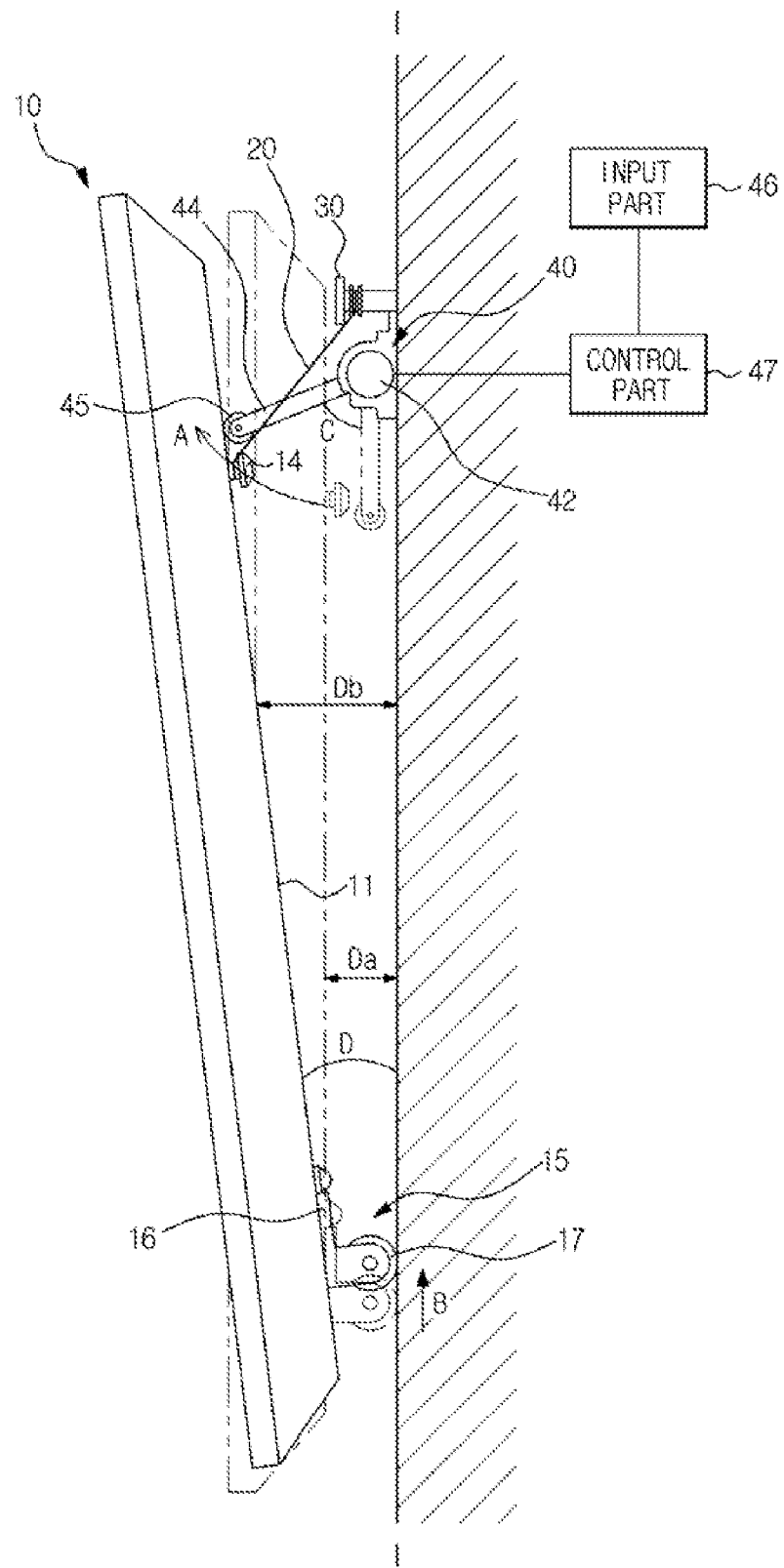
FIG. 2 is a view illustrating operation of the lifting device for the display apparatus according to an exemplary embodiment of the present general inventive concept.

FIG. 1 is an exploded perspective view illustrating the overall outer appearance of a lifting device for a display apparatus according to an exemplary embodiment of the present general inventive concept, and FIG. 2 is a view illustrating operation of the lifting device for the display apparatus according to the exemplary embodiment.

The lifting device for the display apparatus according to an exemplary embodiment of the present general inventive concept, as illustrated in FIGS. 1 and 2, may include a wire 20 connected to a display apparatus 10, a wire hanger 30 to fix the wire 20 to a wall so as to support the weight of the display apparatus 10, and a tilting unit 40 to adjust a viewing angle of the display apparatus 10.

The display apparatus 10 may include a housing 10a having a front side 10b and a rear side 11. The housing 10a may have a circuit to control a display panel of the front side 10b to display an image according to a control of the circuit.

The wire 20 may be provided to connect the display apparatus 10 and the wire hanger 30 to each other. The wire 20 may be made of metal so as to withstand the weight of the display apparatus 10. Both ends 21 and 22 of the wire 20 may be coupled to opposite sides of a rear surface (rear side) 11 of the display apparatus 10.

Wire unit 10c may include a plurality of wire sub units 10c1 and 10c2. Each wire sub unit 10c and 10c2 may include a fastening screw 14, an annular holder 14a, as well as a wire 20. Each wire sub unit 10c1 and 10c2 may be attached to the rear side 11 via holes 12 in the housing 10a.

Roller unit 10d may include a spacing member 15. The spacing member 15 may include a fastening bracket 16, a wheel 17, as well as wheel mount 17a. The spacing member 15 may be mounted on the rear side 11 of the housing 10a via holes 13 in the housing 10a.

Wire unit 10c may be spaced apart from the roller unit 10d by a distance in the direction of Y, as illustrated in FIG. 1. Further, wire sub units 10c1 and 10c2 are spaced apart from each other by a distance in a direction X. Also, wire sub units 10c and/or 10c2 may be connected to an external device, such as a wire hanger 30, disposed on a reference plane. Furthermore, roller unit 10d may be disposed on a reference plane.

The rear surface 11 of the display apparatus 10 may be indented with a plurality of holes 12 and 13 perpendicular to the rear surface 11. The plurality of holes 12 and 13 may include a pair of upper holes 12 arranged at upper opposite sides of the rear surface 11 for coupling of the wire 20, and a pair of lower holes 13 arranged at lower opposite sides of the rear surface 11 to couple spacing members 15 which will be described hereinafter.

Each of the upper holes 12 may be fastened with an annular holder 14a to which the wire 20 is coupled, and a fastening screw 14 to fasten the holder 14a to the rear surface 11 of the display apparatus 10.

Both the ends 21 and 22 of the wire 20 may be looped and each may be fixed to an outer periphery of the holder 14a. The fastening screw 14 may penetrate through the center of the annular holder 14a to thereby be screwed into the upper hole 12 thus serving to fixedly fasten the holder 14a to the rear surface 11 of the display apparatus 10.

With the above-described configuration wherein the wire 20 may be fixed to the upper holes 12 in the rear surface 11 of the display apparatus 10, an upper portion of the display apparatus 10 may be tilted forward when the wire 20 connected to the display apparatus 10 is hung on the wire hanger 30 on the wall.

To prevent forward tilting of the display apparatus 10, the lifting device for the display apparatus according to an exemplary embodiment may include the spacing members 15 coupled to the lower holes 13. The spacing members 15 may allow a lower portion of the display apparatus 10 to be supported on the wall while being spaced apart from the wall by a predetermined distance.

Since the lower portion of the display apparatus 10 may be spaced apart from the wall by a predetermined distance by the spacing members 15, the display apparatus 10 may maintain a constant distance from the wall in a vertical direction and may have no risk of being tilted forward.

Each of the spacing members 15 may include a fastening bracket 16 to fasten the spacing member 15 to the rear surface 11 of the display apparatus 10, and may include a first wheel 17 rotatably coupled to the fastening bracket 16. The fastening bracket 16 may have a screw hole 16a formed in an upper portion thereof, through which a screw to fasten the spacing member 15 to the lower hole 13 can be inserted. The fastening bracket 16 may further have a wheel mount 17a formed in a lower portion thereof, to which the first wheel 17 may be rotatably coupled.

When the display apparatus 10 performs a tilting operation, as illustrated in FIG. 2, the upper portion of the display apparatus 10 where the upper holes 12 may be located may move along an arc as indicated by the arrow A about the wire hanger 30. With this tilting operation, the upper portion of the display apparatus 10 may be pivotally rotated forward to have a certain inclination, and the lower portion of the display apparatus 10 may be moved upward along the wall in a vertical direction as indicated by the arrow B.

In this case, the first wheel 17 may be vertically movable while being supported on the wall and therefore, may enable a smooth tilting operation of the display apparatus 10 without damage to the rear surface 11 of the display apparatus 10.

The upper and lower holes 12 and 13 may be so-called VESA holes processed in the rear surface 11 of the display apparatus 10 to comply with Video Electronics Standards Association (VESA) wall-mount standards. Using the VESA holes without additional hole-processing of the display apparatus 10, the wire 20 and first wheel 17 may be coupled to the display apparatus 10 in a simplified manner.

The tilting unit 40, included in the lifting device for the display apparatus according to an exemplary embodiment of the present general inventive concept, may include a fixing bracket 41 to couple the tilting unit 40 to the wall, a drive motor 42 provided at the fixing bracket 41, an arm 44 having one end coupled to the drive motor 42 so as to rotate about a rotating shaft 43 of the drive motor 42, and a second wheel 45 provided at the other end of the arm 44 to allow the arm 44 to smoothly move up and down on the rear surface 11 of the display apparatus 10.

Although the fixing bracket 41 may be mounted to the wall independently of the wire hanger 30, the exemplary embodiment of the present general inventive concept proposes that the wire hanger 30 may be integrally formed at an upper end of the fixing bracket 41 so as to fix the tilting unit 40 to the wall when the wire hanger 30 is mounted to the wall.

The drive motor 42 may be provided with a gear (not shown) engaged with the rotating shaft 43.

The arm 44 may take the form of a bar extending perpendicular to the rotating shaft 43, and the second wheel 45 may be rotatably coupled to the other end of the arm 44.

Since the arm 44 may be pivotally rotated upward via operation of the drive motor 42, the arm 44 may press an upper portion of the rear surface 11 of the display apparatus 10 thereby causing the display apparatus 10 to tilt.

In this case, the drive motor 42 may be set to exhibit a predetermined stop torque equal to or greater than a force to pull the display apparatus 10 toward the wall. Thereby, even if operation of the drive motor 42 can be stopped in a tilted state of the display apparatus 10, the drive motor 42 can function as a rotation obstructer to prevent rotation of the arm 44 in order to maintain the tilted state of the display apparatus 10.

The tilting unit 40 may further include an input part 46 to apply operating signals of the drive motor 42, and a control part 47 to control the drive motor 42 based on the signals from the input part 46 (see FIG. 2).

The input part 46 may be provided in the display apparatus 10 or via a remote controller (not shown). The input part 46 may rotate the arm 44 by a preset rotation angle C, or may apply On/Off signals of the drive motor 42 to the control part 47.

The control part 47 can operate the drive motor 42 based on the signals applied from the input part 46, to thereby adjust the rotation angle C of the arm 44.

For example, if a user selects a tilting mode, the control part 47 may rotate the arm 44 by the rotation angle C corresponding to a predetermined tilting angle D recorded in the control part 47. Specifically, the tilting mode may be classified, for example, into upper, medium, and lower levels based on the tilting angle D. If the user selects any one of the upper, medium, and lower levels, the control part 47 may rotate the arm 44 by the rotation angle C corresponding to the predetermined tilting angle D of the selected upper, medium, or lower level.

Also, since the drive motor 42 may be operated to rotate the arm 44 in proportion to a time required to apply the signals to the drive motor 42 via the input part 46, the display apparatus 10 can be tilted to a desired tilting angle selected by the user.

In the lifting device for the display apparatus according to an exemplary embodiment of the present general inventive concept, as described above, the wire 20 may be connected to the upper holes 12 in the rear surface 11 of the display apparatus 10 using the holders 14a and fastening screws 14, and the spacing members 15 may be coupled to the lower holes 13. In addition, the tilting unit 40 may be integrally formed with the wire hanger 30 is fixedly screwed to the wall, thus completing the assembly of the lifting device for the display apparatus.

Thereafter, if the wire 20 that may be connected to the display apparatus 10 is hung on the wire hanger 30 fixed to the wall, installation of the display apparatus 10 may be completed.

The above-described lifting device for the display apparatus according to an exemplary embodiment of the present general inventive concept may have the effect of improving space utility due to a minimized distance between the display apparatus 10 and the wall and also, may easily adjust the viewing angle of the display apparatus 10 by operating the tilting unit 40 using a remote controller, etc. The distance between the display apparatus 10 and the wall when the arm 44 is not extended is defined by Da. The distance between the display apparatus 10 and the wall when the arm 44 has extended wherein the arm is at least in contact with the rear surface 11 of the display apparatus 10 is defined by Db.

Figure 3:
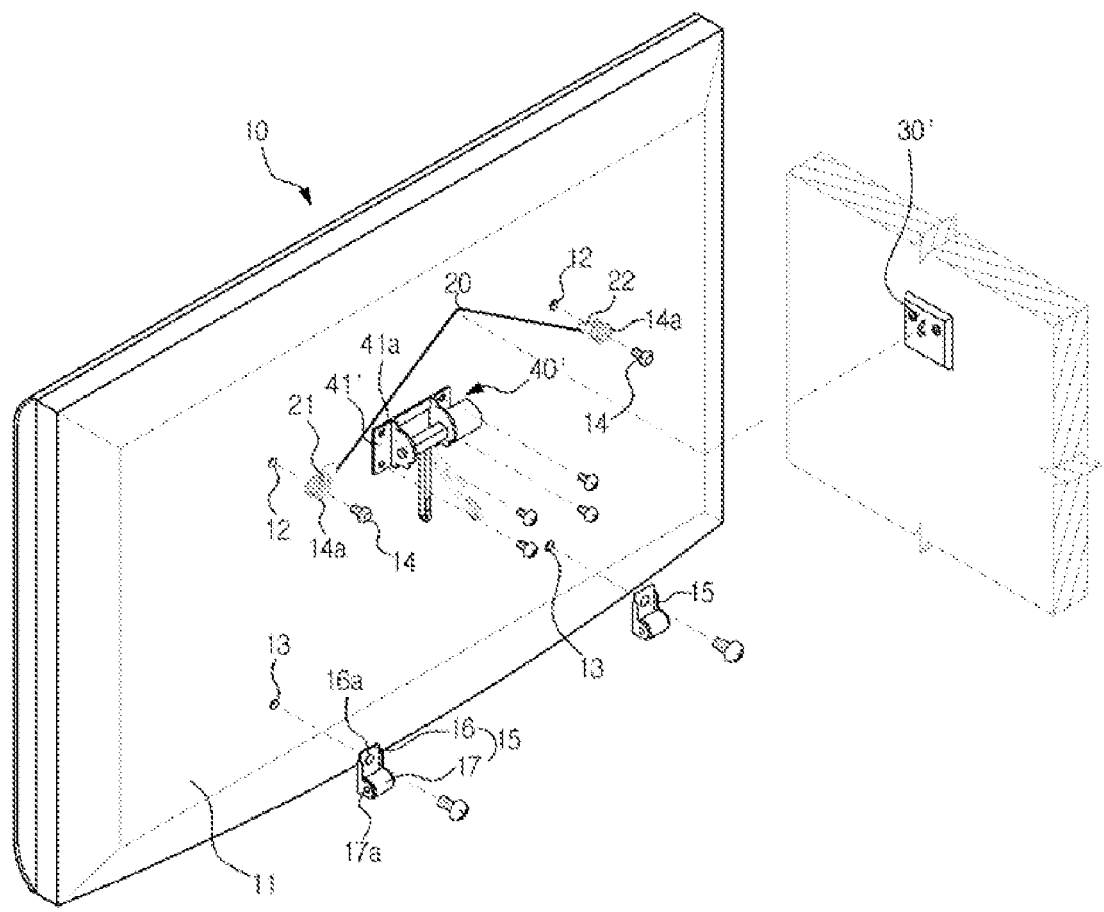
FIG. 3 is a perspective view illustrating a lifting device for a display apparatus according to another exemplary embodiment of the present general inventive concept.

FIG. 3 is a perspective view illustrating a lifting device for a display apparatus according to another exemplary embodiment of the present general inventive concept.

The lifting device for the display apparatus according to another exemplary embodiment of the present general inventive concept has substantially the same configuration as the above-described exemplary embodiment of the present general inventive concept, except for an installation position of the tilting unit may be changed.

Identification of the same elements as those of the exemplary embodiments of the present general inventive concept described above are designated by the same reference numerals for the alternative exemplary embodiments of the present general inventive concept, and a description thereof will be omitted.

Although an exemplary embodiment of the present general inventive concept describes the tilting unit may be integrally formed with the wire hanger, in another exemplary embodiment, a wire hanger 30' and a tilting unit 40' may be provided as individual elements separated from each other.

More specifically, although the wire hanger 30' may be fixed to the wall and the tilting unit 40' may be fixed to any one of the wall or the rear surface of the display apparatus, another exemplary embodiment describes, for example, the tilting unit 40' may be fixed to the rear surface 11 of the display apparatus 10.

The tilting unit 40' may have substantially the same configuration as another exemplary embodiment of the present general inventive concept, except that a fixing bracket 41' may be formed with a screw hole 41a to fasten the tilting unit 40' to the rear surface 11 of the display apparatus 10.

Accordingly, the tilting unit 40' may be selectively coupled to the wall or the rear surface of the display apparatus, and may exhibit the same effect as another exemplary embodiment of the present general inventive concept.

Figure 4:
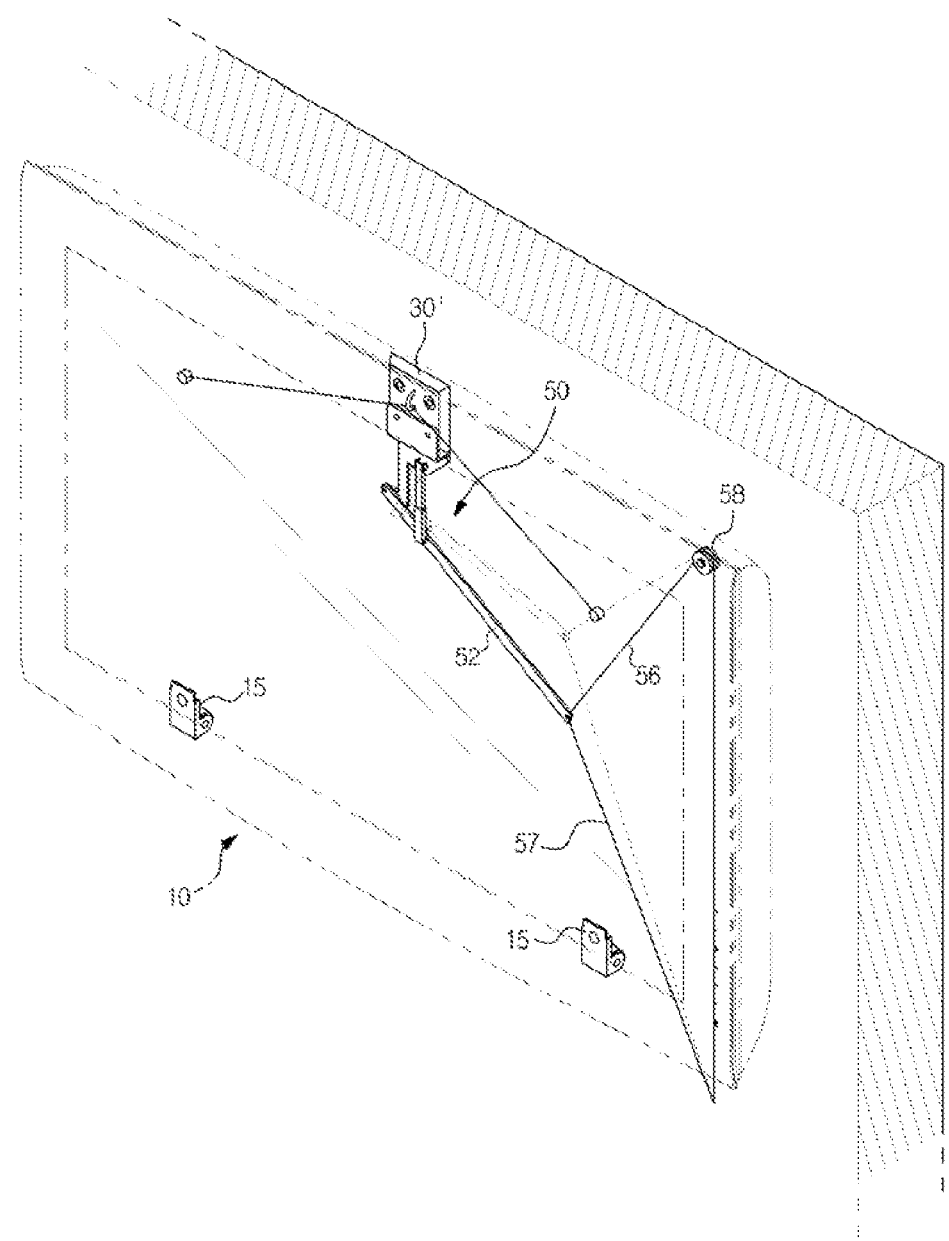
FIG. 4 is a perspective view illustrating the overall outer appearance of a lifting device for a display apparatus according to another exemplary embodiment of the present general inventive concept.
Figure 5:
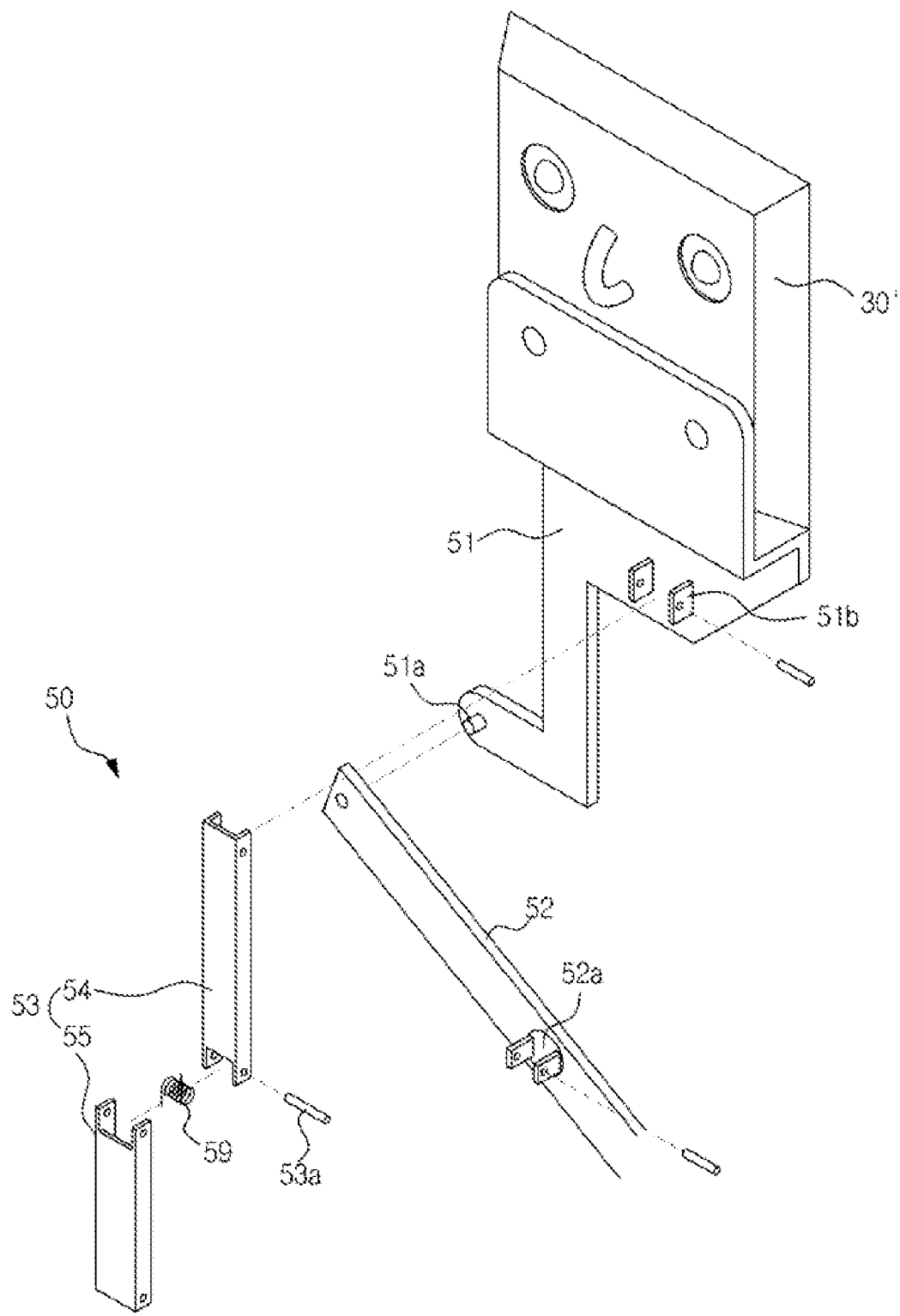
FIG. 5 is an exploded perspective view illustrating a tilting unit included in the lifting device for the display apparatus according to another exemplary embodiment of the present general inventive concept.
Figure 6:
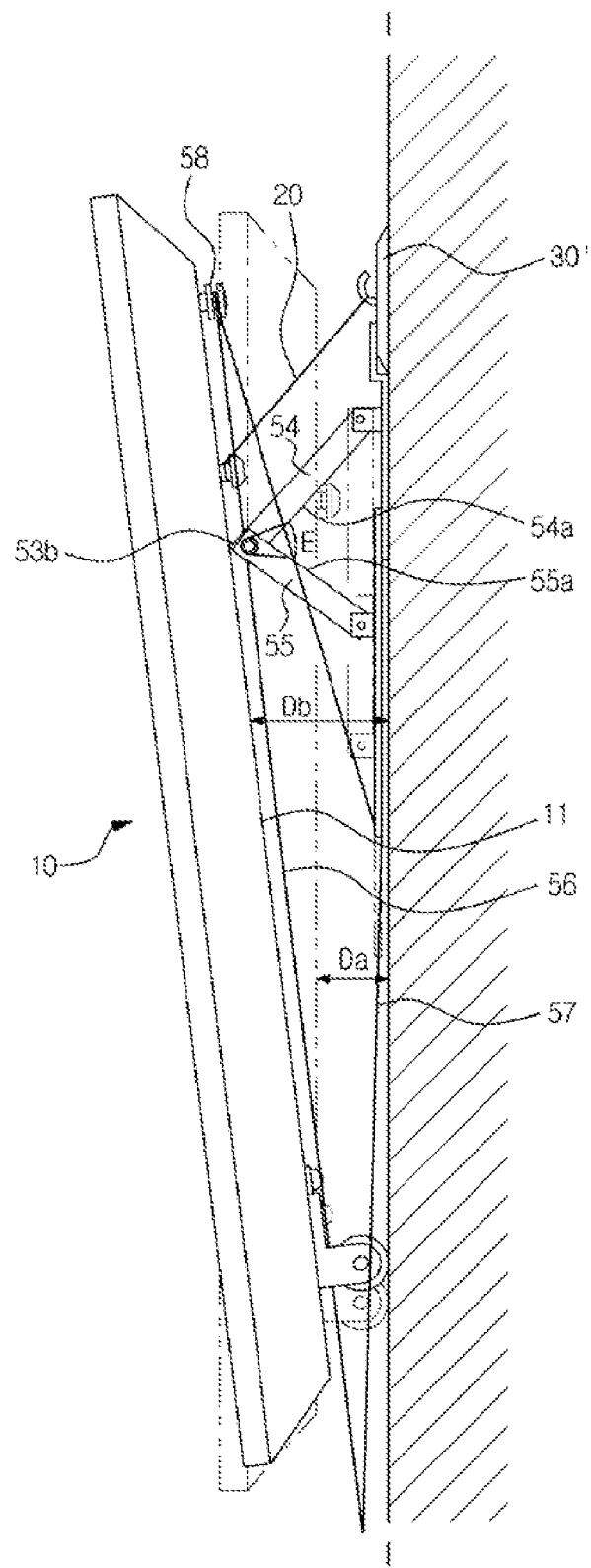
FIG. 6 is a view illustrating operation of the lifting device for the display apparatus according to another exemplary embodiment of the present general inventive concept.

FIG. 4 is a perspective view illustrating the overall outer appearance of a lifting device for a display apparatus according to another exemplary embodiment of the present general inventive concept, FIG. 5 is an exploded perspective view illustrating a tilting unit included in the lifting device for the display apparatus according to another exemplary embodiment of the present general inventive concept, and FIG. 6 is a view illustrating operation of the lifting device for the display apparatus according to another exemplary embodiment of the present general inventive concept.

As illustrated in FIGS. 4 to 6, the lifting device for the display apparatus according to another exemplary embodiment of the present general inventive concept may include the wire 20 connected to the display apparatus 10, the spacing members 15 may be provided in the lower portion of the rear surface 11 of the display apparatus 10, the wire hanger 30' to fix the wire 20 to the wall so as to support the weight of the display apparatus 10, and a tilting unit 50 to adjust a viewing angle of the display apparatus 10.

The lifting device for the display apparatus according to another exemplary embodiment of the present general inventive concept have substantially the same configuration as another exemplary embodiment of the present general inventive concept except for the tilting unit 50. More specifically, the wire coupling configuration and spacing members, that may be provided at the rear surface of the display apparatus, may have the same configurations as another exemplary embodiment of the present general inventive concept, and the wire hanger fixed to the wall may have the same configuration as another exemplary embodiment of the present general inventive concept.

In the following description, the same elements as those of another exemplary embodiment of the present general inventive concept are designated by the same reference numerals, and a description thereof will be omitted.

The tilting unit 50 according to another exemplary embodiment of the present general inventive concept may include a fixing frame 51 to fix the tilting unit 50 to the wall or the rear surface of the display apparatus 10, an operating lever 52 may be rotatably connected to the fixing frame 51 for operation of the tilting unit 50, and a link 53 may be moved via operation of the operating lever 52 so as to adjust an inclination angle of the display apparatus 10 relative to the wall.

Although the fixing frame 51 may be fixed to the rear surface of the display apparatus 10 using screws, in an exemplary embodiment of the present general inventive concept, for example, the fixing frame 51 may be integrally formed with the wire hanger 30' to thereby be fixed to the wall without additional screws.

The fixing frame 51 has a first coupling piece 51a to which one end of the operating lever 52 may be rotatably coupled, and second coupling pieces 51b between which one end of the link 53 may be pivotally and rotatably coupled, the first and second coupling pieces 51a and 51b may be configured to desired shapes.

The operating lever 52 may take the form of an elongated bar, and may have one end rotatably coupled to the fixing frame 51.

The other end of the operating lever 52 may be connected to a pair of operating wires 56 and 57, to allow the user to easily rotate the operating lever 52. The operating lever 52 may be formed, approximately in the middle thereof, with a third coupling piece 52a to which one end of a second link 55 will be described hereinafter is connected. The third coupling piece 52a may be rotatably provided on the operating lever 52.

A roller 58 to guide the first operating wire 56 may be provided at a position close to an upper end of the rear surface 11 of the display apparatus 10, or may be provided at a corresponding position on the wall.

More specifically, the first operating wire 56, which may be connected to the other end of the operating lever 52, may be wound on the roller 58 to extend downward from the roller 58. The second operating wire 57 may extend downward from the other end of the operating lever 52 without being wound on the roller 58 to thereby be positioned at the lower portion of the display apparatus 10. With this configuration, instead of directly rotating the operating lever 52, the user may rotate the operating lever 52 upward by pulling the first operating wire 56, and may rotate the operating lever 52 downward by pulling the second operating wire 57.

The link 53 may be variable in coupling angle according to rotation of the operating lever 52 and may serve to press the rear surface 11 of the display apparatus 10 in order to tilt the display apparatus 10. The link 53 may include a first link 54 having one end rotatably coupled to the fixing frame 51, and a second link 55 having one end coupled to approximately the middle of the operating lever 52 and the other end coupled to the other end of the first link 54.

Both the first link 54 and the second link 55 may be rotatably coupled to each other via a connecting shaft 53a, and the connecting shaft 53a may be provided with an elastic member 59.

The elastic member 59 may be a torsion spring inserted on the connecting shaft 53a. One end of the elastic member 59 may be supported on a first face 54a of the first link 54, and the other end of the elastic member 59 may be supported on a first face 55a of the second link 55. Thereby, the elastic member 59 may apply elastic force to the link 53, so as to reduce a coupling angle E of the first and second links 54 and 55, i.e. so as to cause a coupling region 53b of the first and second links 54 and 55 to protrude forward.

With the above-described configuration, if the user pulls down the first operating wire 56, the operating lever 52 may be rotated upward, causing the coupling region 53b of the first and second links 54 and 55, connected to the operating lever 52, to protrude forward. The forwardly protruding operating lever 52 may press the rear surface 11 of the display apparatus 10, causing the display apparatus 10 to tilt.

Then, if the user releases the force usable with the first operating wire 56, the elastic force of the elastic member 59 and a moving force of the display apparatus 10 toward the wall may be in equilibrium, whereby the display apparatus 10 may be maintained in a tilted state.

On the other hand, if the user pulls the second operating wire 57 down, the operating lever 52 may be rotated downward, causing the coupling angle E of the first and second links 54 and 55, connected to the operating lever 52, to be increased. Thereby, the coupling region 53b of the first and second links 54 and 55 may retreat rearward, releasing the display apparatus 10 from the tilted state.

Since a protruding length of the coupling region 53b may be determined as the coupling angle E of the first and second links 54 and 55 varies according to the rotation of the operating lever 52, the user may realize a desired tilting angle of the display apparatus 10 by appropriately rotating the operating lever 52 using the first and second operating wires 56 and 57 (see FIG. 6).

Next, an alteration of another exemplary embodiment of the present general inventive concept will be described.

Figure 7:
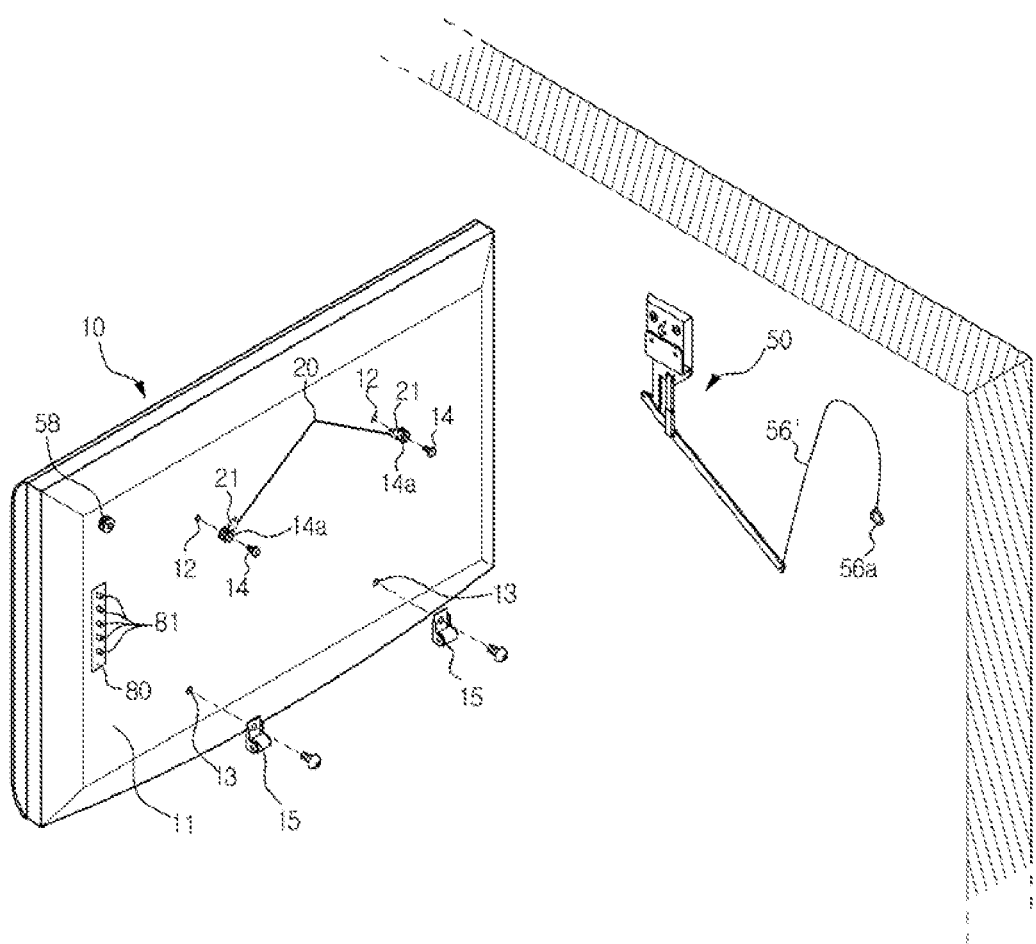
FIG. 7 is a perspective view illustrating a lifting device for a display apparatus according to another exemplary embodiment of the present general inventive concept.

FIG. 7 is a perspective view illustrating a lifting device for a display apparatus according to another exemplary embodiment of the present general inventive concept.

As compared to another exemplary embodiment of the present general inventive concept, the lifting device for the display apparatus according to another exemplary embodiment has substantially the same configuration, except that the lifting device may include a fixing hanger to which the first operating wire may be fixed, and that the second operating wire may be omitted.

In the alteration, the elastic member 59 may apply elastic force to the link 53, so as to increase the coupling angle of the first and second links 54 and 55, i.e. so as to retreat the coupling region 53b of the first and second links 54 and 55 rearward.

The distance between the display apparatus 10 and the wall when links 54 and 55 are extended in direction B is defined by Db. The distance between the display apparatus 10 and the wall when links 54 and 55 are not extended in direction B is defined by Da.

A fixing hanger 80, to which the first operating wire 56 may be fixed, may be located below the roller 58 and may have a plurality of protrusions 81 longitudinally spaced apart from one another by a predetermined distance. In this case, a corresponding end of the first operating wire 56 may be formed with a ring 56a to be caught by a selected one of the protrusions 81.

In a state wherein the first operating wire 56 may be fixedly caught by any one of the plurality of protrusions 81 of the fixing hanger 80, a tilting angle of the display apparatus 10 may be adjusted as the coupling region of the first and second links 54 and 55 may be moved to protrude forward or retreat rearward according to the appropriately adjusted rotation of the operating lever 52.

Next, a lifting device for a display apparatus according to another exemplary embodiment of the present general inventive concept will be described.

Figure 8:
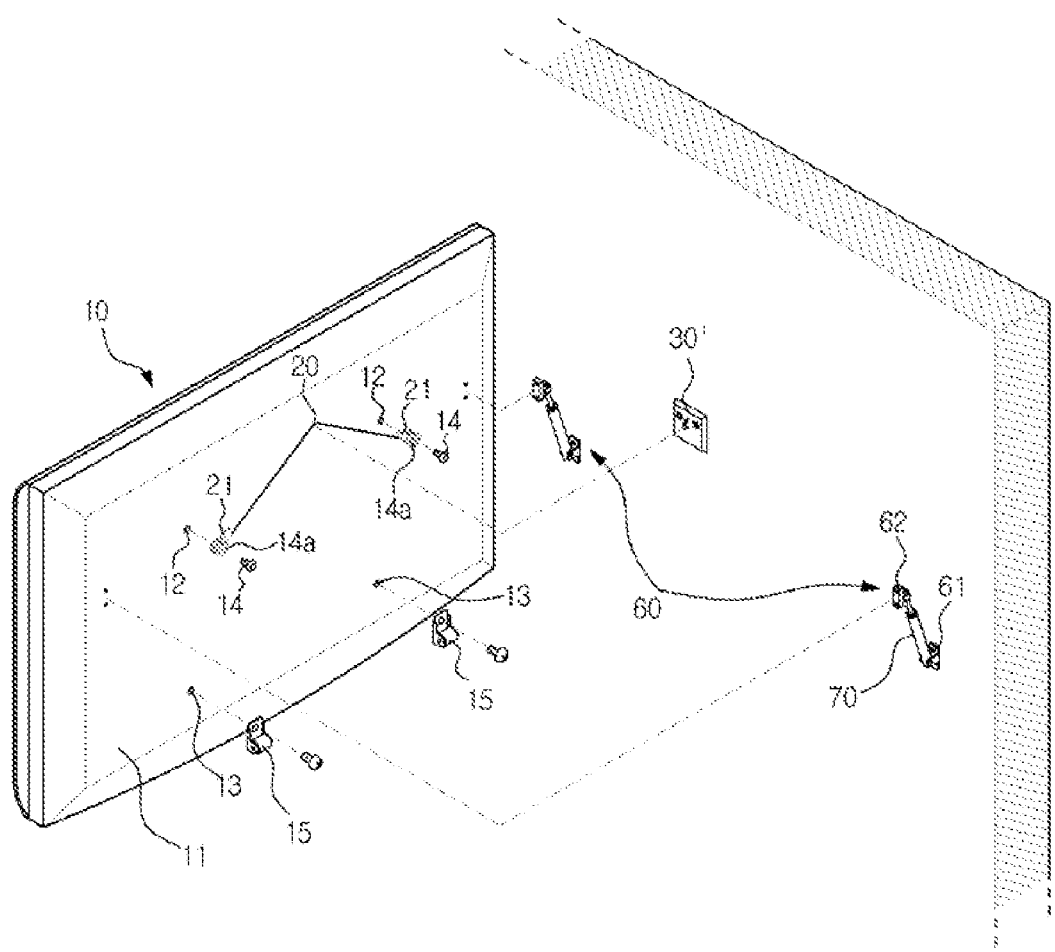
FIG. 8 is an exploded perspective view illustrating the overall outer appearance of a lifting device for a display apparatus according to another exemplary embodiment of the present general inventive concept.
Figure 9:
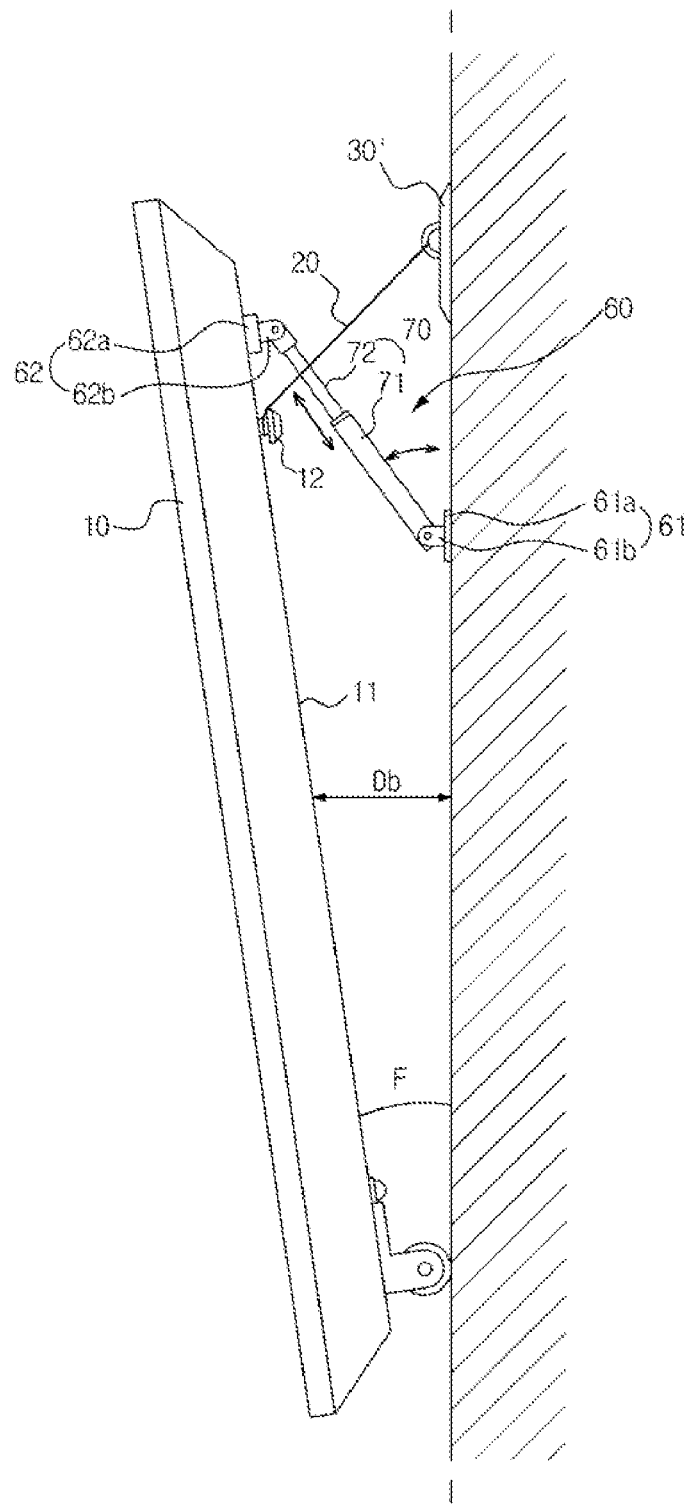
FIG. 9 is a view illustrating operation of the lifting device for the display apparatus according to another exemplary embodiment of the present general inventive concept.
Figure 10:
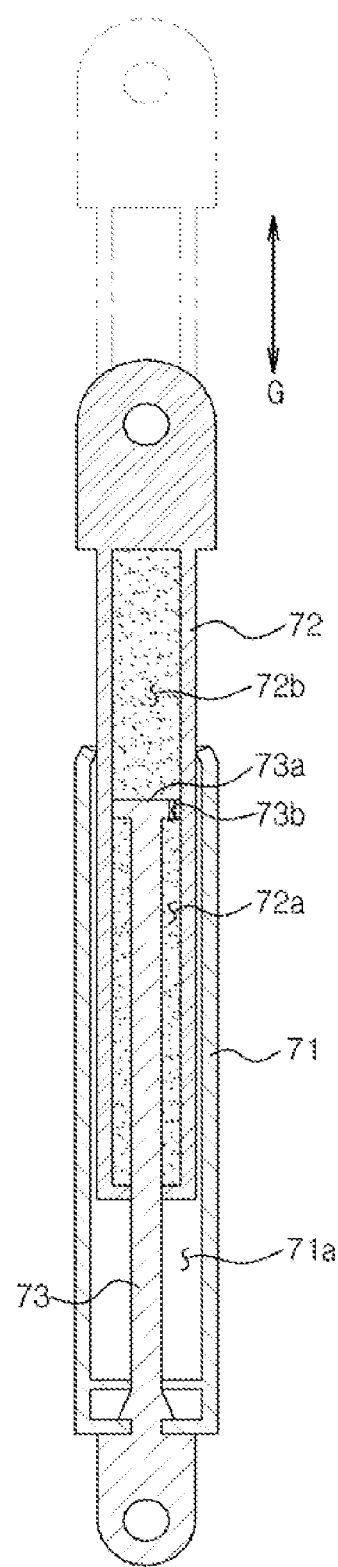
FIG. 10 is a sectional view illustrating an arm included in the lifting device for the display apparatus according to another exemplary embodiment of the present general inventive concept.

FIG. 8 is an exploded perspective view illustrating the overall outer appearance of a lifting device for a display apparatus according to another exemplary embodiment of the present general inventive concept, FIG. 9 is a view illustrating operation of the lifting device for the display apparatus according to another exemplary embodiment of the present general inventive concept, and FIG. 10 is a sectional view illustrating an arm included in the lifting device for the display apparatus according to another exemplary embodiment of the present general inventive concept.

The lifting device for the display apparatus according to another exemplary embodiment of the present general inventive concept can have substantially the same configuration as another exemplary embodiment except for the configuration of the tilting unit. More specifically, in another exemplary embodiment of the present general inventive concept, the wire coupling configuration and spacing members, provided at the rear surface of the display apparatus, may have the same configurations as another exemplary embodiment, and the wire hanger that may be to the wall may have the same configuration as another exemplary embodiment of the present general inventive concept.

The same elements as those of another exemplary embodiment of the present general inventive concept are designated by the same reference numerals, and a description thereof is omitted.

A tilting unit 60 according to another exemplary embodiment of the present general inventive concept may serve to adjust a viewing angle of the display apparatus 10 with the use of force acting on the display apparatus 10. The tilting unit 60 may include at least one arm 70 to apply force to both the wall and the display apparatus 10 so as to maintain an adjusted tilting angle F after force acting on the display apparatus 10 is removed, a first fixing piece 61 to rotatably fix one end of the arm 70 to the wall, and a second fixing piece 62 to rotatably fix the other end of the arm 70 to the rear surface 11 of the display apparatus 10. The distance between the display apparatus 10 and the wall is defined as Db In an exemplary embodiment of the present general inventive concept, a pair of arms 70 may be provided, and each of the arms 70 may include a cylinder 71 having one end rotatably fixed to the first fixing piece 61 and a piston 72 having one end rotatably fixed to the second fixing piece 62, the piston 72 being reciprocally movable in the cylinder 71.

A predetermined force may be normally usable with the arm 70 to extract the piston 72 from the cylinder 71. If the piston 72 is pushed toward the cylinder 71 by a force greater than the predetermined force, the piston 72 may be slidably pushed into the cylinder 71. Then, as soon as the force is removed, the piston 72 may again be extracted from the cylinder 71 to thereby be returned to its original position.

Although various configurations may be provided to enable the above-described operation, another exemplary embodiment of the present general inventive concept may employ hydraulic or pneumatic absorbers to realize the above-described operation, and a detailed configuration thereof will be described.

For example, the arm 70 to realize the above-described operation, as illustrated in FIG. 10, is configured such that the piston 72 may be slidable in the cylinder 71. Compressible air is charged into an interior hollow space 71a of the cylinder 71, and a guide rod 73 may be located in the center of the hollow space 71a to guide reciprocating movements of the piston 72. A head 73a formed at a tip end of the guide rod 73 may divide the piston 72 into first and second regions 72a and 72b. The head 73a may be formed with an orifice 73b to enable flow of fluid into the first and second regions 72a and 72b.

Alternatively, instead of the compressible air, a compressible spring may be inserted into the hollow space 71a to achieve the same effect.

The interior of the piston 72 may be filled with fluid, and an outer peripheral surface of the piston 72 may be reciprocally movable on an inner peripheral surface of the cylinder 71.

Accordingly, upon reciprocating movements of the piston 72, fluid received in any one of the first and second regions 72a or 72b may flow into the other region 72b or 72a through the orifice 73b formed in the head 73a of the guide rod 73, to enable smooth reciprocating movements of the piston 72.

While no external force acts on the arm 70, the piston 72 may be continuously kept in an extracted state from the cylinder 71 by the compressible air or the compressible spring in the cylinder 71. Then, if the piston 72 is pushed in a direction G, the compressible air in the cylinder 71 may be compressed, causing the fluid in the first region 72a of the piston 72 to flow into the second region 72b through the orifice 73b. Thereby, the piston 72 may be smoothly pushed into the cylinder 71. In this case, as soon as the external force is removed, the compressible air may expand, causing the piston 72 to be extracted from the cylinder 71.

The first fixing piece 61 may include a first bracket 61a to fix the first fixing piece 61 to the wall, and a first support 61b protruding forward from the first bracket 61a to rotatably fix the cylinder 71 to the wall.

The second fixing piece 62 includes a second bracket 62a to fix the second fixing piece 62 to the rear surface 11 of the display apparatus 10, and a second support 62b may protrude rearward from the second bracket 62a to rotatably fix the second fixing piece 62 to the piston 72.

Accordingly, after a pair of the first fixing pieces 61 may be fixed to the wall using screws, the cylinder 71 may be coupled to a corresponding one of the first fixing pieces 61. Then, after fixing a pair of the second fixing pieces 62 to opposite upper positions on the rear surface 11 of the display apparatus 10, the piston 72 may be coupled to a corresponding one of the second fixing pieces 62. In this way, the tilting unit 60 may be completely assembled.

In the lifting device for the display apparatus according to another exemplary embodiment of the present general inventive concept, if the user forces the display apparatus 10 to tilt the display apparatus 10, as illustrated in FIG. 9, the upper portion of the display apparatus 10 where the upper holes 12 may be located may be moved along an arc about the wire hanger 30', causing the display apparatus 10 to tilt.

In this case, both ends of the arm 70 may be fixed to the rear surface of the display apparatus 10 and the wall, respectively, and thus, the arm 70 may rotate to cause the piston 72 to be extracted from the cylinder 71.

If the user's force is removed after the display apparatus 10 is tilted by a predetermined tilting angle F, a force to push the piston 72 into the cylinder by the weight of the display apparatus 10 and a force acting on the arm 70 to extract the piston 72 from the cylinder 71 may be in equilibrium, whereby the display apparatus 10 may be maintained in the predetermined tilting angle F.

Since the display apparatus 10 varies in weight according to a model type thereof, the arm 70 for use with the display apparatus 10 may be prepared via appropriate adjustment in the compressibility of the compressible air and the elasticity of the compressible spring located in the cylinder 71.

Next, a lifting device for a display apparatus according to another exemplary embodiment of the present general inventive concept will be described.

Figure 11:
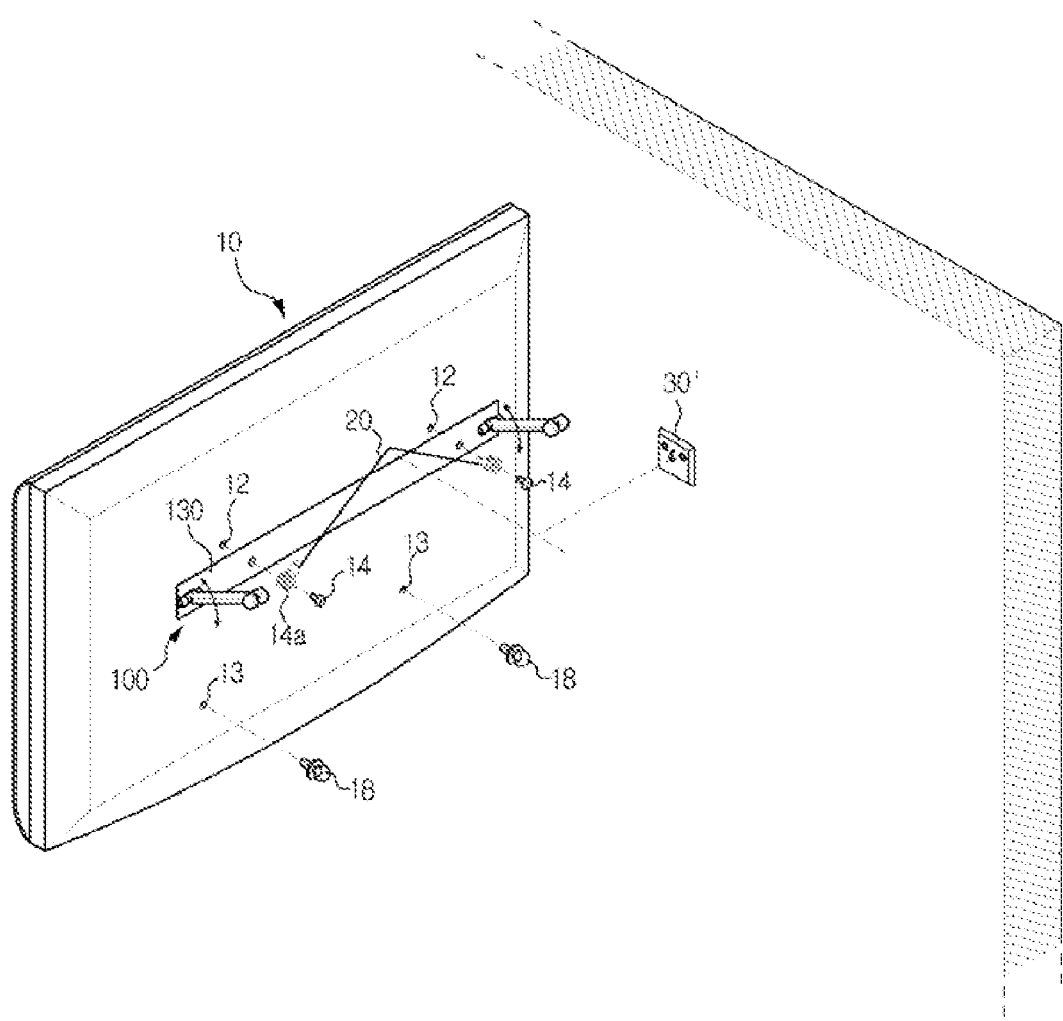
FIG. 11 is an exploded perspective view illustrating the overall outer appearance of a lifting device for a display apparatus according to another exemplary embodiment of the present general inventive concept.
Figure 12:
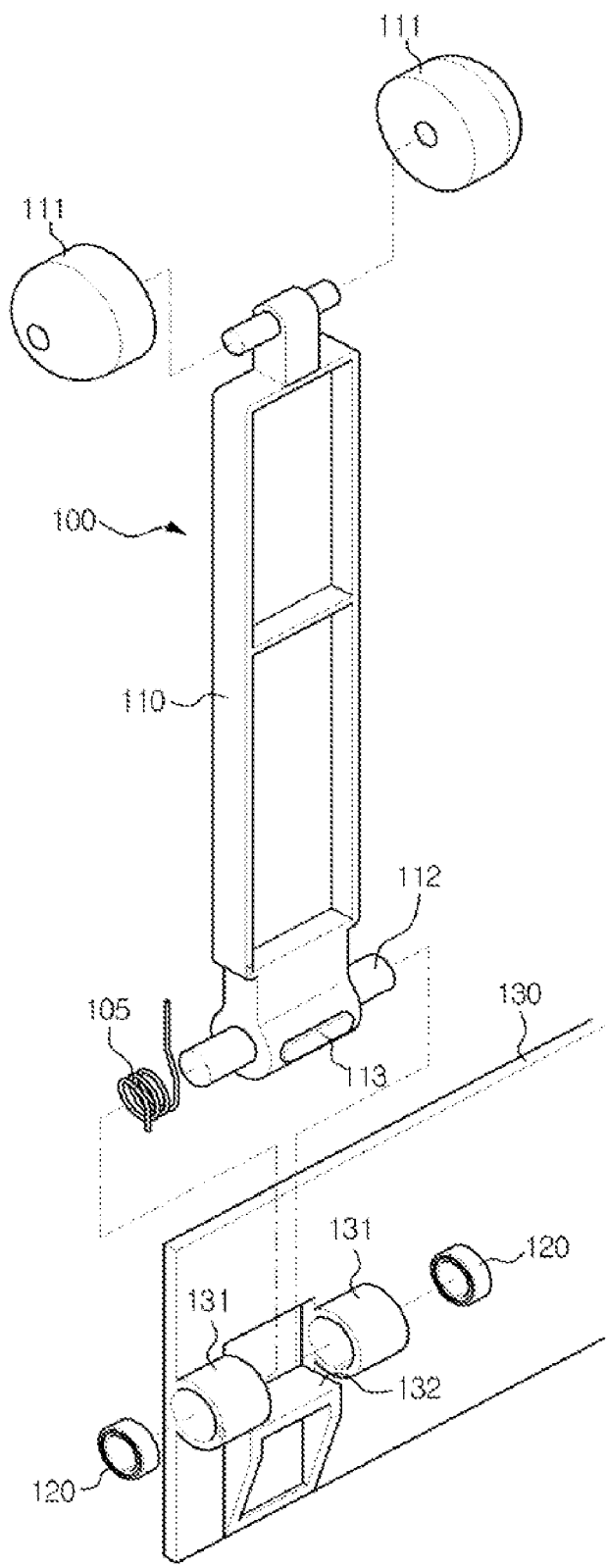
FIG. 12 is an exploded perspective view illustrating a tilting unit included in the lifting device for the display apparatus according to another exemplary embodiment of the present general inventive concept.
Figure 13:
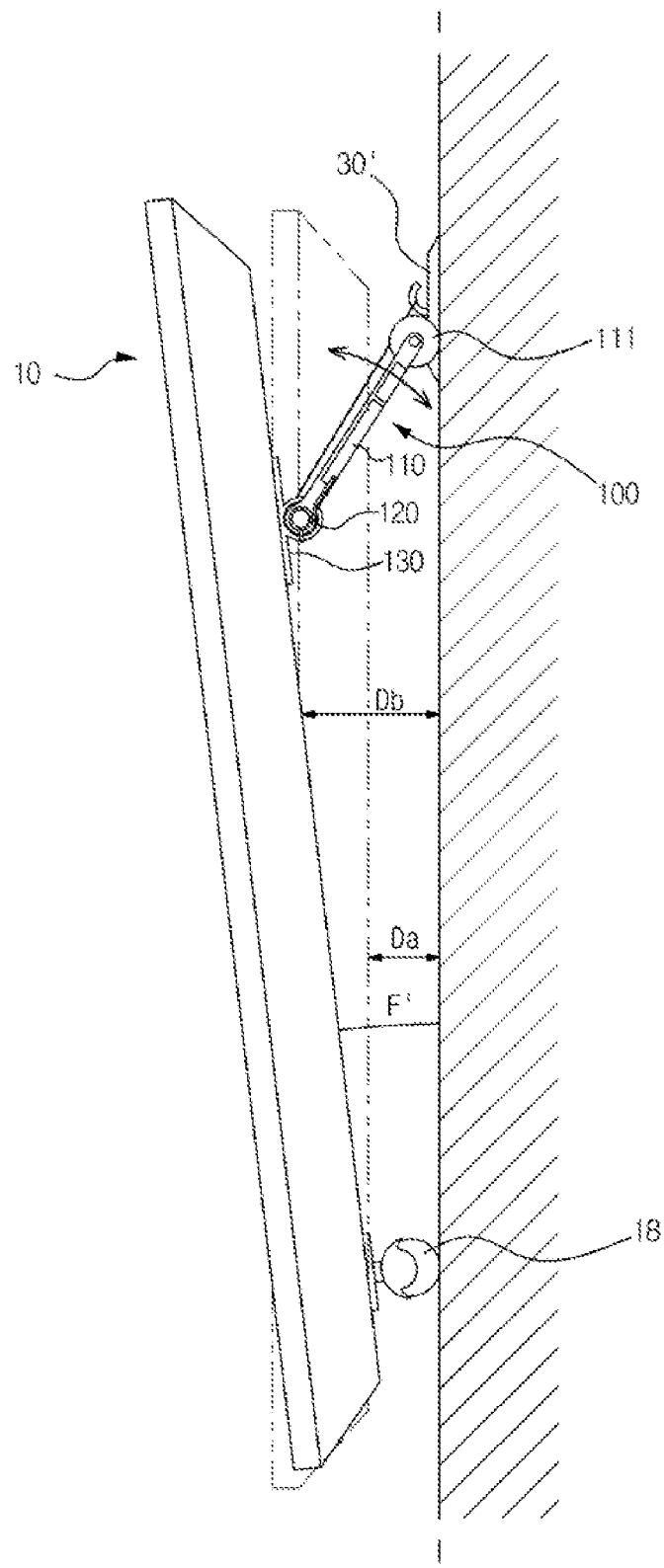
FIG. 13 is a view illustrating operation of the lifting device for the display apparatus according to another exemplary embodiment of the present general inventive concept.
Figure 14:
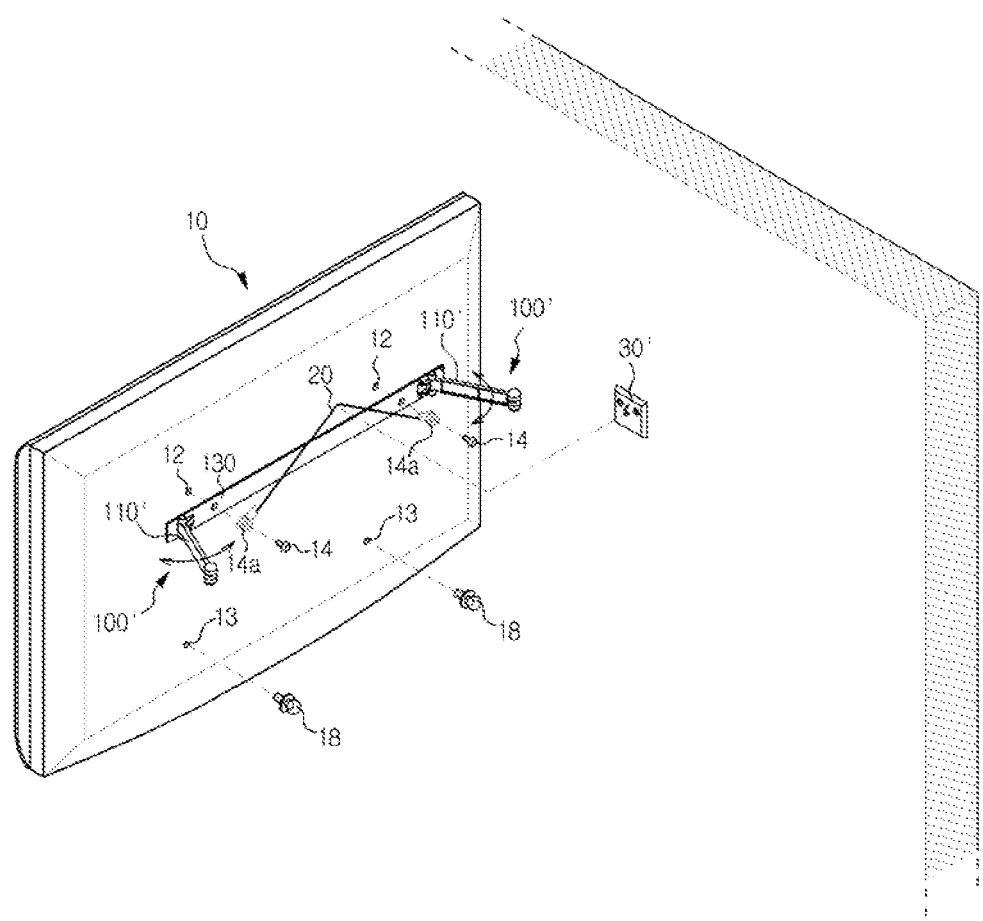
FIG. 14 is an exploded perspective view illustrating the overall outer appearance of a lifting device for a display apparatus according to another exemplary embodiment of the present general inventive concept.

FIG. 11 is an exploded perspective view illustrating the overall outer appearance of a lifting device for a display apparatus according to another exemplary embodiment of the present general inventive concept, FIG. 12 is an exploded perspective view illustrating a tilting unit included in the lifting device for the display apparatus according to another exemplary embodiment of the present general inventive concept, and FIG. 13 is a view illustrating operation of the lifting device for the display apparatus according to another exemplary embodiment of the present general inventive concept. Also, FIG. 14 is an exploded perspective view illustrating the overall outer appearance of a lifting device for a display apparatus according to another exemplary embodiment of the present general inventive concept.

The lifting device for the display apparatus according to another exemplary embodiment of the present general inventive concept may have substantially the same configuration as another exemplary embodiment, except for the configuration of the tilting unit. More specifically, in another exemplary embodiment, the wire coupling configuration and spacing members, provided at the rear surface of the display apparatus, may have the same configurations as another exemplary embodiment of the present general inventive concept, and the wire hanger fixed to the wall may have the same configuration as another exemplary embodiment of the present general inventive concept.

The same elements as those of another exemplary embodiment of the present general inventive concept are designated by the same reference numerals, and a description thereof is omitted.

A tilting unit 100 according to another exemplary embodiment of the present general inventive concept, as illustrated in FIGS. 11 and 12, may serve to adjust a viewing angle of the display apparatus 10 using force acting on the display apparatus 10. The tilting unit 100 may include at least one arm 110 rotatably installed to the rear surface of the display apparatus 10 and used to adjust a distance between the wall and the display apparatus 10 according to a rotation angle thereof, and rotation obstructers 120 to provide a force counter to a force applied by the display apparatus to the wall in order to maintain an adjusted tilting angle of the display apparatus 10 after force acting on the display apparatus 10 is removed. The tilting unit 100 having the above-described configuration may be mounted to the rear surface of the display apparatus 10 using a bracket 130. The distance between the display apparatus 10 and the wall when the rotating arm 110 is not extended is defined by Da. The distance between the display apparatus 10 and the wall when the rotating arm 110 has extended wherein the arm is at least in contact with the rear surface 11 of the display apparatus 10 is defined by Db.

The arm 110, as illustrated in FIG. 12, takes the form of a bar having a predetermined length. A rotating shaft 112 may be provided at one end of the arm 110, to rotatably couple the arm 110 to the rear surface of the display apparatus 10. The other end of the arm 110 may be rotatably provided with wheels 111, to allow the arm 110 to smoothly rotate on the wall.

The arm 110 may be rotatable upward or downward, to enable upward or downward tilting of the display apparatus 10.

To assure easy connection of, for example, electric wires to terminals provided at the lower portion of the rear surface of the display apparatus 10, a tilting unit 100' to tilt the display apparatus 10 leftward or rightward may be necessary. To enable leftward or rightward tilting of the display apparatus 10, as illustrated in FIG. 14, an arm 110' may be mounted to the bracket 130 so as to be rotatable leftward or rightward.

The rotation obstructers 120 may provide the rotating shaft 112 of the arm 110 with a force counter to a force applied by the display apparatus 10 to the wall, in order to maintain an adjusted tilting angle F' of the display apparatus 10 after force acting on the display apparatus 10 is removed.

The rotation obstructers 120 may be bearings to generate a torque counter to a force applied by the display apparatus 10 to the wall via operation of the arm 110 when the arm 110 is rotated in a given direction.

When a force to rotate the arm 110 rearward of the display apparatus 10 is usable with the arm 110, the rotation obstructers 120 may allow smooth rotation of the arm 110. On the contrary, when a force to rotate the arm 110 toward the rear surface of the display apparatus 10 is usable with the arm 110, the rotation obstructers 120 may generate a torque counter to a predetermined force (i.e. a force usable with the wall by the display apparatus 10 when no external force is applied).

Accordingly, when no force is applied by the user, as illustrated in FIG. 13, the rotation obstructers 120 may apply an opposite directional force corresponding to a force applied by the display apparatus 10 to the wall and thus, may maintain the adjusted tilting angle F'.

In this case, if the user presses the display apparatus 10 toward the wall with a greater force than a predetermined force provided by the rotation obstructers 120, the arm 110 may be rotated toward the rear surface of the display apparatus 10, resulting in a reduced tilting angle. Similarly, once the external force is removed at a predetermined tilting angle, the adjusted tilting angle may be maintained.

The bracket 130 may be provided at the rear surface of the display apparatus 10, to mount the tilting unit 100.

The bracket 130 may take the form of a transversely extending elongated bar, and may be installed to the rear surface of the display apparatus 10. The bracket 130 may be fixedly screwed to the upper VESA holes 12.

The bracket 130 may serve to fix the wire 20. For this, the holders 14a corresponding to the upper VESA holes 12 may be inserted through the bracket 130. In a state wherein the holders 14a may be inserted through the bracket 130, the coupling screws 14 penetrate through the centers of the holders 14a, allowing the bracket 130, integrated with the holders 14a, to be fixed to the rear surface of the display apparatus 10.

Spacing members 18 may be mounted to the lower VESA holes 13, to allow the lower portion of the display apparatus 10 to be supported on the wall with a predetermined distance from the wall. Although the spacing members 18 may have the same configuration as the first embodiment, the spacing members 18 of another exemplary embodiment may be wheels to rotate in various directions like a mouse ball.

The pair of arms 110 may be rotatably located outside the holders 14a, and the bracket 130 may have rotating shaft receiving portions 131 to rotatably receive the rotating shafts 112 of the respective arms 110.

Although the rotation obstructers 120 may be coupled to any positions of the arm 110 to exhibit the above-described function, the rotation obstructers 120 may be preferably coupled to the rotating shaft 112 of the arm 110.

More specifically, after the rotation obstructers 120 as bearings may be fixedly mounted in the rotating shaft receiving portions 131, the rotating shaft 112 of the arm 110 may be inserted into the rotation obstructers 120.

The tilting unit 100 may include an elastic member 105 coupled to the rotating shaft 112 of the arm 110, to provide the arm 110 with an elastic force so as to press the wall.

Although the elastic member 105 may have various configurations such as springs, elastic rubber bands, etc., in an exemplary embodiment of the present general inventive concept, for example, the elastic member 105 may be a torsion spring. The torsion spring 105 may be coupled to the rotating shaft 112 of the arm 110.

One end of the elastic member 105 may be fixed to the rotating arm 110, and the other end of the elastic member 105 may be fixed to the rotating shaft receiving portion 131. Thereby, the arm 110 may be pivotally rotated rearward of the display apparatus 10 by the elastic force of the elastic member 105 when no external force is applied.

In this case, to prevent the arm 110 from being excessively rotated by the elastic member 105, the bracket 130 may be formed with a stopper 132 and correspondingly, the arm 110 may be formed with a stopper holder 113.

Accordingly, even if the display apparatus 10 may be excessively spaced apart from the wall as the user forwardly pulls the display apparatus 10 mounted to the wall, the stopper holder 113 of the arm 110 may be caught by the stopper 132 of the bracket 132, whereby excessive rotation of the arm 110 may be prevented and consequently, malfunction of the tilting unit 100 may be prevented.

Next, operation of the lifting device for the display apparatus according to another exemplary embodiment of the present general inventive concept will be described with reference to the accompanying drawings.

If the user pushes the display apparatus 10 mounted to the wall rearward until the rear surface of the display apparatus 10 touches the wall, each arm 110 may be pivotally rotated upward. Then, if the user does not apply external force any more, a force applied by the elastic member 105 to rotate the arm 110 rearward may be offset by the weight of the display apparatus 10. Thereby, the display apparatus 10 may be maintained parallel to the wall (without tilting).

Thereafter, if the user pulls the upper portion of the display apparatus 10 forward, the wheels 111 of the arm 110 may move downward on the wall, allowing the arm 110 to rotate rearward of the display apparatus 10 by the elastic member 105. In this case, if the external force applied by the user is removed at a certain tilting angle F', the rotation obstructers 120 may provide a force counter to a force applied by the display apparatus 10 to the wall, and thus, the display apparatus 10 may be maintained at an adjusted tilting angle.

Then, if the user presses the display apparatus 10 toward the wall with a greater force than a predetermined force provided by the rotation obstructers 120, the arm 110 may rotate toward the rear surface of the display apparatus 10, resulting in a reduced tilting angle. Similarly, if the external force is removed at a certain titling angle, the display apparatus 10 may be maintained at the adjusted tilting angle.

Hereinafter, a lifting device for a display apparatus according to another exemplary embodiment of the present general inventive concept will be described.

Figure 15:
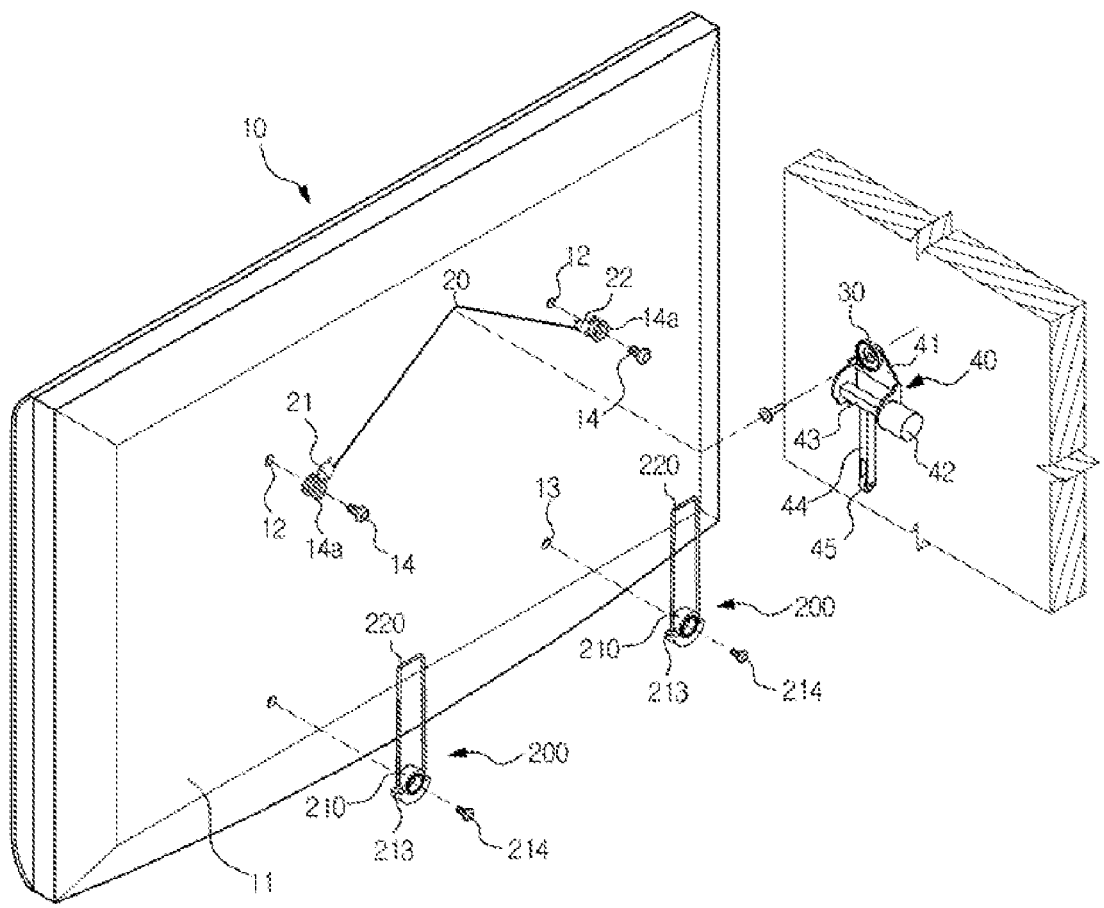
FIG. 15 is an exploded perspective view illustrating the overall outer appearance of a lifting device for a display apparatus according to another exemplary embodiment of the present general inventive concept.
Figure 16:
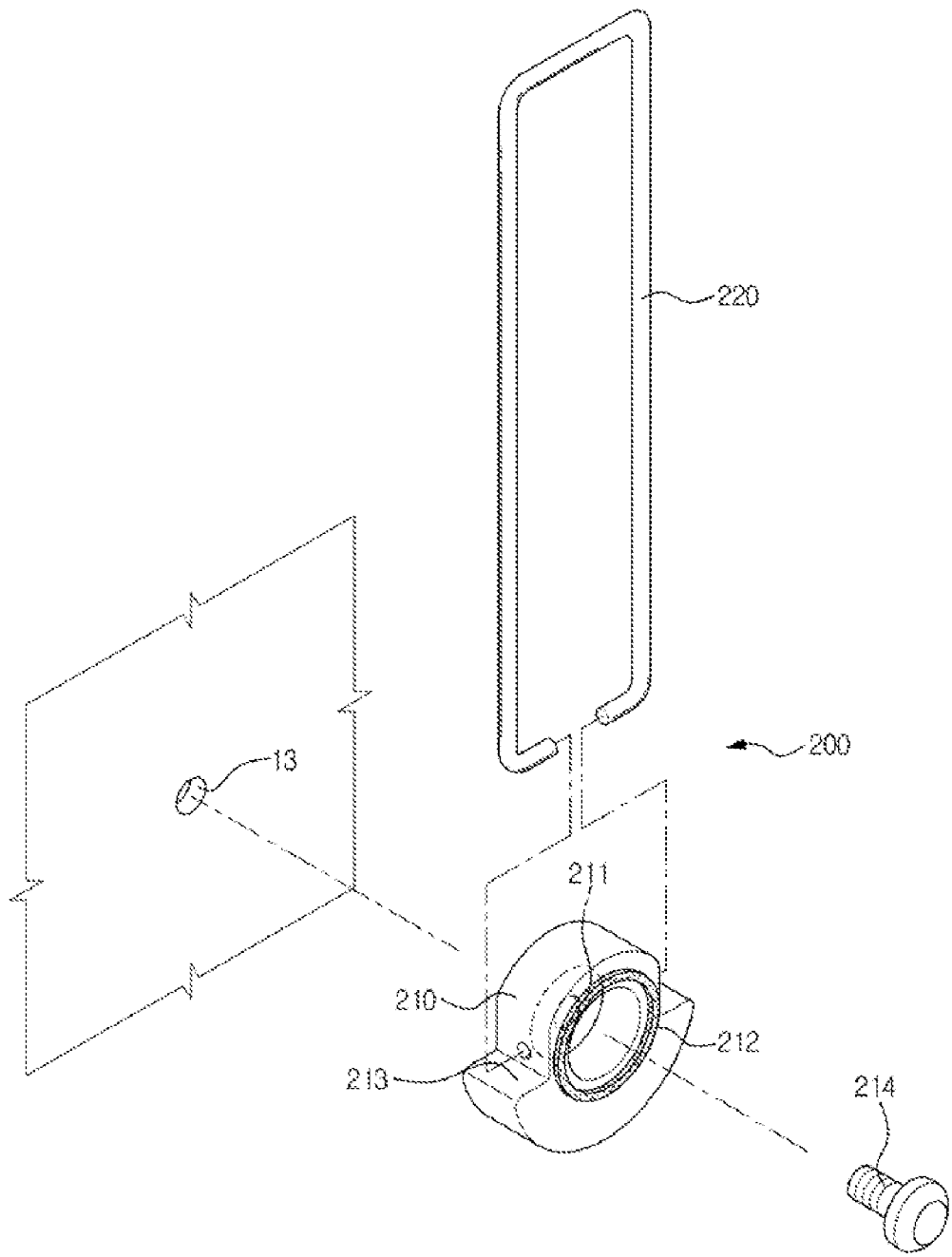
FIG. 16 is an exploded perspective view illustrating an auxiliary tilting unit of the lifting device for the display apparatus according to another exemplary embodiment of the present general inventive concept.
Figure 17:
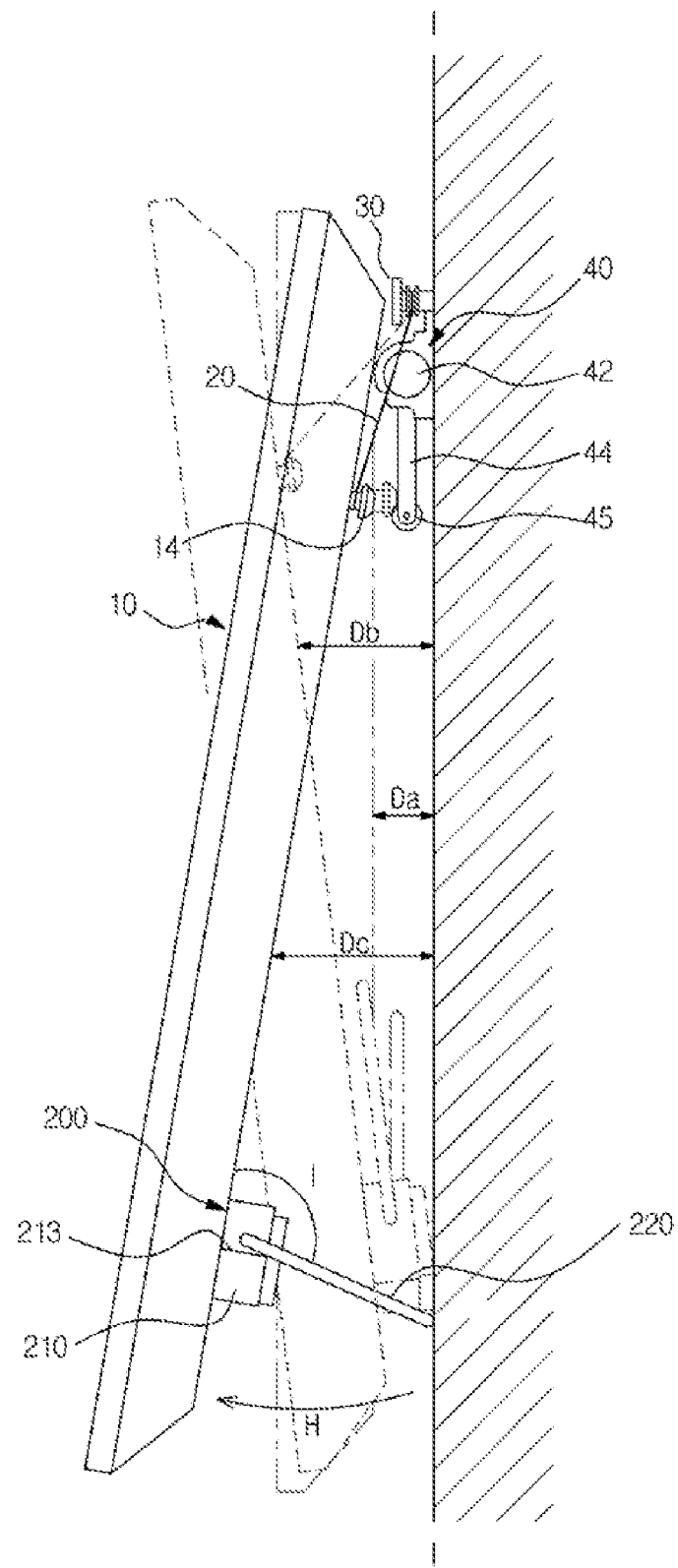
FIG. 17 is a view illustrating operation of the lifting device for the display apparatus according to another exemplary embodiment of the present general inventive concept.

FIG. 15 is an exploded perspective view illustrating the overall outer appearance of a lifting device for a display apparatus according to another exemplary embodiment of the present general inventive concept, FIG. 16 is an exploded perspective view illustrating an auxiliary tilting unit of the lifting device for the display apparatus according to another exemplary embodiment of the present general inventive concept, and FIG. 17 is a view illustrating operation of the lifting device for the display apparatus according to another exemplary embodiment of the present general inventive concept.

As illustrated in FIG. 15, the lifting device for the display apparatus according to another exemplary embodiment of the present general inventive concept may include the wire 20 connected to the display apparatus 10, the wire hanger 30 to fix the wire 20 to the wall so as to support the weight of the display apparatus 10, the tilting unit 40 provided at the upper portion of the rear surface 11 of the display apparatus 10 and used to adjust a viewing angle of the display apparatus 10, and auxiliary tilting units 200 provided under the tilting unit 40 and used to tilt the lower portion of the display apparatus 10 forward or rearward.

The wire 20, wire hanger 30 and tilting unit 40 may have the same configuration as any other exemplary embodiments of the present general inventive concept. Although the same configuration as that of another exemplary embodiment will be described hereinafter by way of example, the configurations of the wire, wire hanger and tilting unit may not be limited to the following description.

The wire, wire hanger and tilting unit having the same configurations as another exemplary embodiment may be designated by the same reference numerals as another exemplary embodiment of the present general inventive concept, and a detailed description thereof will be omitted.

The wire 20 may be provided to connect the display apparatus 10 and the wire hanger 30 to each other. The wire 20 may be made of metal so as to withstand the weight of the display apparatus 10. Both the ends 21 and 22 of the wire 20 are coupled to opposite sides of the rear surface 11 of the display apparatus 10.

The rear surface 11 of the display apparatus 10 may be indented with the plurality of holes 12 and 13 perpendicular to the rear surface 11. The plurality of holes 12 and 13 may include the pair of upper holes 12 arranged at upper opposite sides of the rear surface 11 to couple the wire 20, and the pair of lower holes 13 arranged at lower opposite sides of the rear surface 11 to couple the auxiliary tilting units 200.

Similar to another exemplary embodiment of the present general inventive concept, the holders 14a to which the wire 20 may be coupled may be fastened into the upper holes 12 by use of the fastening screws 14.

The auxiliary tilting units 200 may be coupled to the lower holes 200. The auxiliary tilting units 200 may serve not only to allow the display apparatus 10 to be installed parallel to the wall, but also to tilt the lower portion of the display apparatus 10 forward or rearward.

Each of the auxiliary tilting units 200, as illustrated in FIGS. 15 and 16, may include a fixing part 210 coupled to the lower hole 13, and a rotating arm 220 rotatably mounted to the fixing part 210.

The fixing part 210 may have a thickness sufficient to allow the lower portion of the display apparatus 10 to be spaced apart from the wall by a predetermined distance so as to keep the display apparatus 10 parallel to the wall.

The fixing part 210 may be centrally formed with a screw insertion hole 211 for screw fastening. A rear surface of the fixing part 210 in contact with the wall may be provided with a buffer member 212 to dampen shock caused when the display apparatus 10 comes into contact with the wall.

The buffer member 212, for example, may be made of rubber and various other materials functioning to absorb shock.

The rotating arm 220 may be rotatably mounted to the fixing part 210.

Although the rotating arm 220 may be mounted in a vertically rotatable manner or in a horizontally rotatable manner, an exemplary embodiment of the present general inventive concept deals with the vertically rotatably mounted rotating arm 220 by way of example.

The fixing part 210 may include a supporting portion 213 to prevent excessive rotation of the rotating arm 220.

Accordingly, if the user moves the lower portion of the display apparatus 10 away from the wall in a forward direction (indicated by the arrow H) in a state wherein the rotating arm 220 is arranged adjacent to the rear surface 11 of the display apparatus 10, the rotating arm 220 may be rotated downward until the rotating arm 220 comes into contact with the supporting portion 213. In such a state, if the external force applied by the user is removed, as illustrated in FIG. 17, a free end of the rotating arm 220 may be supported on the wall, whereby the lower portion of the display apparatus 10 may be kept in a forwardly tilted state.

In a state wherein the lower portion of the display apparatus 10 may be tilted as described above, the user may be able to easily access terminals (not shown) arranged at the lower portion of the rear surface 11 of the display apparatus 10.

In this case, to prevent the rotating arm 220 from being pressed and unintentionally rotated upward by the weight of the display apparatus 10, it may be desirable that an angle (I) between the rear surface 11 of the display apparatus 10 and the rotating arm 220 be greater than 90 degrees.

The upper and lower holes 12 and 13 may be so-called VESA holes processed in the rear surface 11 of the display apparatus 10 to comply with Video Electronics Standards Association (VESA) wall-mount standards. Using the VESA holes without additional hole-processing of the display apparatus 10, the wire 20 and auxiliary tilting units 200 may be coupled to the display apparatus 10 in a simplified manner.

As described above, the lifting device for the display apparatus may accomplish improved space utility due to a minimized distance between the display apparatus 10 and the wall and also, may enable easy adjustment of a viewing angle of the display apparatus 10 as the tilting unit may be operable using a remote controller, etc. The distance between the display apparatus 10 and the wall when neither arm 44 or rotating arm 220 are extended in direction B is defined by Da. The distance between the display apparatus 10 and the wall when arm 44 is extended and rotating arm is not extended is defined by Db. The distance between the display apparatus 10 and the wall when the arm 44 is not extended and the rotating arm 220 is extended is defined by Dc.

The above-described auxiliary tilting unit 200 may allow the lower portion of the display apparatus 10 to be spaced apart from the wall by a predetermined distance and in particular, may allow the display apparatus 10 to maintain a constant distance from the wall in a vertical direction, thereby preventing the display apparatus 10 from being tilted forward. In addition, the auxiliary tilting unit 200 may be able to tilt the lower portion of the display apparatus 10 forward independently of the tilting unit 40, to allow the display apparatus 10 to be tilted by various tilting angles and also, to allow the user to easily access terminals (not shown) provided at the rear surface 11 of the display apparatus 10.

As apparent from the above description, the exemplary embodiments of the present general inventive concept provide several advantageous features as follows.

Firstly, in the lifting device for the display apparatus according to the exemplary embodiments of the present general inventive concept, a tilting unit may be operated using a drive motor, etc., to allow a user to easily adjust a viewing angle of the display apparatus.

Secondly, there is minimal risk of a rotating arm of the lifting device connected to the drive motor being unintentionally rotated when the drive motor is not operated, and this may have the effect of reducing malfunction in the adjustment of the viewing angle.

Thirdly, fixing a wire of the lifting device using VESA holes of the display apparatus may eliminate additional processing to form a wire fixing structure, thus possibly resulting in enhanced fabrication efficiency.

Fourthly, the display apparatus may be provided at a rear surface thereof with wheels to prevent the display apparatus from being obliquely installed to the wall.

Fifthly, mounting an auxiliary tilting unit to the rear surface of the display apparatus may allow a lower portion of the display apparatus to be tilted forward independently of operation of a tilting unit. This may realize various tilting angles of the display apparatus and may allow a user to easily access terminals provided at the rear surface of the display apparatus.

Although the embodiment of the present general inventive concept has been shown and described, it would be appreciated by those skilled in the art that changes may be made in this embodiment without departing from the principles and spirit of the general inventive concept, the scope of which is defined in the claims and their equivalents.

What is claimed is:

1. A lifting device for a display apparatus comprising:
   a wire connected to the display apparatus and connectable to a wall; and
   at least one tilting unit to adjust a viewing angle of the display apparatus without the tilting unit being connected to the wire, the tilting unit including a rotatable arm to adjust a distance between the wall and the display apparatus, and a rotation obstructer to provide the arm, supported on both the wall and the display apparatus, with a force counter to a force applied by the display apparatus to the wall when no external force is applied.

2. The lifting device according to claim 1, wherein the tilting unit further includes a drive motor to rotate the arm.

3. The lifting device according to claim 2, wherein the rotation obstructer is the drive motor to generate a predetermined stop torque.

4. The lifting device according to claim 1, wherein the distance between the wall and the display apparatus is adjusted according to a predetermined rotation angle of the arm.

5. The lifting device according to claim 1, further comprising a bracket to mount the tilting unit to a rear surface of the display apparatus,
   wherein the bracket includes a holder to fix the wire.

6. The lifting device according to claim 1, wherein the tilting unit further includes a wheel provided at a side of the arm and adapted to be rotated relative to the arm.

7. The lifting device according to claim 5, wherein:
   a plurality of VESA holes is formed in the rear surface of the display apparatus according to Video Electronics Standards Association (VESA) wall mount standards; and
   the bracket is fixed to the VESA holes.

8. The lifting device according to claim 1, wherein:
   upper and lower holes are formed in a rear surface of the display apparatus; and
   the lifting device further comprises: a coupling screw fastened into the upper hole so as to fix an end of the wire to the display apparatus; and a spacing member fastened to the lower hole so as to space the rear surface of the display apparatus from the wall by a predetermined distance.

9. The lifting device according to claim 8, wherein the upper and lower holes are VESA holes formed according to Video Electronics Standards Association (VESA) wall mount standards.

10. The lifting device according to claim 8, wherein the spacing member includes a wheel to be moved on the wall during a tilting operation of the display apparatus.

11. A lifting device for a display apparatus comprising:
    a wire connected to the display apparatus to hang the display apparatus on a wall, and at least one tilting unit to adjust a viewing angle of the display apparatus using a force acting on the display apparatus,
    wherein the tilting unit is connected to one of the display apparatus and the wall and not connected to the other of the display apparatus and the wall, and the tilting unit includes an arm to rotate and abut against the other of the display apparatus and the wall to apply a force to the display apparatus and the wall so as to maintain the viewing angle of the display apparatus when the force acting on the display apparatus is removed.

12. The lifting device according to claim 11, wherein the arm is rotatably provided to adjust a distance between the wall and the display apparatus based on a predetermined rotation angle of the arm.

13. The lifting device according to claim 11, wherein the at least one tilting unit includes a pair of tilting units mounted to a rear surface of the display apparatus.

14. The lifting device according to claim 11, wherein the arm is rotatable up-and-down or left-and-right.

15. The lifting device according to claim 11, wherein the tilting unit further includes a rotation obstructer coupled to a rotating shaft of the arm and serving to generate an opposite directional torque when the arm is rotated in a given direction.

16. The lifting device according to claim 13, wherein:
    a plurality of VESA holes is formed in the rear surface of the display apparatus according to Video Electronics Standards Association (VESA) wall mount standards; and
    the lifting device further comprises a bracket to mount the pair of tilting units, and the bracket is fixed to the VESA holes.

17. The lifting device according to claim 16, wherein the bracket includes a holder to fix an end of the wire.

18. The lifting device according to claim 16, wherein the bracket includes a stopper to prevent excessive rotation of the arm, and the arm includes a stopper holder corresponding to the stopper.

19. The lifting device according to claim 1, wherein end portions of the wire are connected to the display apparatus and a central portion of the wire is connected to the wall.

* * * * *